United States Patent
Jones et al.

(10) Patent No.: US 8,634,873 B2
(45) Date of Patent: Jan. 21, 2014

(54) MOBILE COMMUNICATION DEVICE HAVING MULTIPLE, INTERCHANGEABLE SECOND DEVICES

(75) Inventors: Gregory G. Jones, Seattle, WA (US); Lisa M. Hanson, Issaquah, WA (US); Thomas Kleist, Redbourn (GB)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 12/726,252

(22) Filed: Mar. 17, 2010

(65) Prior Publication Data

US 2011/0230178 A1 Sep. 22, 2011

(51) Int. Cl.
*H04B 1/38* (2006.01)

(52) U.S. Cl.
USPC ....... 455/557; 455/556.1; 455/566; 455/66.1; 455/41.2

(58) Field of Classification Search
USPC ............. 455/577, 41.3, 41.1, 41.2, 3.06, 566, 455/502, 552.1, 575.8, 575.2, 557, 466, 455/422.1, 456.1; 710/60, 313; 345/1.1, 345/169, 173, 156, 109, 698, 204; 370/401, 370/465; 704/3, 275; 715/746
See application file for complete search history.

(56) References Cited

U.S. PATENT DOCUMENTS

| | | | |
|---|---|---|---|
| 5,265,238 A | 11/1993 | Canova, Jr. et al. | |
| 5,590,417 A | 12/1996 | Rydbeck | |
| 5,983,100 A | 11/1999 | Johansson et al. | |
| 6,236,969 B1 | 5/2001 | Ruppert et al. | |
| 6,366,458 B1 | 4/2002 | Yoshida et al. | |
| 6,608,399 B2 | 8/2003 | McConnell et al. | |
| 6,952,617 B1 | 10/2005 | Kumar | |
| 7,162,282 B2 * | 1/2007 | Engstrom et al. | 455/575.3 |
| 7,221,330 B2 * | 5/2007 | Finke-Anlauff | 345/1.1 |
| 7,256,990 B2 | 8/2007 | Grunow et al. | |
| 7,350,011 B2 | 3/2008 | Keely et al. | |
| 7,480,138 B2 | 1/2009 | Kogan et al. | |
| 7,554,510 B1 | 6/2009 | Grigor et al. | |
| 7,593,755 B2 * | 9/2009 | Colando et al. | 455/566 |
| 8,112,037 B2 * | 2/2012 | Ketari | 455/41.3 |
| 2001/0036192 A1 * | 11/2001 | Chiles et al. | 370/401 |

(Continued)

FOREIGN PATENT DOCUMENTS

| | | |
|---|---|---|
| KR | 10-2005-0094941 | 9/2005 |
| KR | 10-2006-0010261 | 2/2006 |

OTHER PUBLICATIONS

Chen et al., "Navigation Techniques for Dual-Display E-Book Readers," CHI 2008, Florence, Italy, Apr. 5-10, 2008.

(Continued)

*Primary Examiner* — Tan Trinh
(74) *Attorney, Agent, or Firm* — Klarquist Sparkman, LLP

(57) ABSTRACT

A mobile communication device comprises a first device with a first display and multiple second devices. The second devices are releasably attachable to the first device and are interchangeable with each other. The mobile device can operate as a mobile cell phone with one or more second devices operable as a mobile phone hand set. The second devices can comprise one or more game controllers, batteries, physical keyboards and/or mobile phone handsets with a display. In a detached configuration, the first device is separated from the second devices and can wirelessly communicate with one or more of the detached second devices. In a three device configuration, the first device can send commands, control signals or content to one or more external devices in addition to the second devices.

18 Claims, 21 Drawing Sheets

(56) References Cited

U.S. PATENT DOCUMENTS

| | | | |
|---|---|---|---|
| 2002/0068614 A1 | 6/2002 | Karidis et al. | |
| 2002/0086703 A1 | 7/2002 | Dimenstein et al. | |
| 2003/0038731 A1* | 2/2003 | Sako et al. | 340/825.26 |
| 2004/0132492 A1* | 7/2004 | Engstrom et al. | 455/556.2 |
| 2004/0183745 A1* | 9/2004 | Choi | 345/1.1 |
| 2004/0233625 A1 | 11/2004 | Saitou et al. | |
| 2005/0037787 A1* | 2/2005 | Bachner et al. | 455/502 |
| 2005/0037818 A1 | 2/2005 | Seshadri et al. | |
| 2005/0091693 A1 | 4/2005 | Amine et al. | |
| 2005/0130593 A1 | 6/2005 | Michalak | |
| 2005/0239401 A1* | 10/2005 | Nam | 455/3.06 |
| 2006/0025176 A1* | 2/2006 | Llamas et al. | 455/557 |
| 2006/0099975 A1* | 5/2006 | Vesuna | 455/466 |
| 2007/0075915 A1 | 4/2007 | Cheon et al. | |
| 2007/0075977 A1* | 4/2007 | Chen et al. | 345/173 |
| 2007/0254730 A1 | 11/2007 | Kim et al. | |
| 2007/0258439 A1 | 11/2007 | Chu | |
| 2008/0022031 A1* | 1/2008 | Lazzarotto et al. | 710/313 |
| 2008/0062625 A1 | 3/2008 | Batio | |
| 2008/0072163 A1 | 3/2008 | Teng et al. | |
| 2008/0195788 A1 | 8/2008 | Tamir et al. | |
| 2008/0248815 A1 | 10/2008 | Busch | |
| 2008/0261626 A1 | 10/2008 | Farazmandnia | |
| 2008/0287147 A1 | 11/2008 | Grant et al. | |
| 2009/0061970 A1 | 3/2009 | Wylie et al. | |
| 2009/0099836 A1* | 4/2009 | Jacobsen et al. | 704/3 |
| 2009/0102744 A1 | 4/2009 | Ram | |
| 2009/0111508 A1* | 4/2009 | Yeh et al. | 455/552.1 |
| 2010/0005396 A1* | 1/2010 | Nason et al. | 715/746 |
| 2010/0056223 A1* | 3/2010 | Choi et al. | 455/566 |
| 2010/0110010 A1* | 5/2010 | Choi | 345/169 |
| 2011/0143769 A1* | 6/2011 | Jones et al. | 455/456.1 |
| 2011/0157264 A1* | 6/2011 | Seshadri et al. | 345/698 |
| 2011/0221765 A1* | 9/2011 | Nason et al. | 345/626 |

OTHER PUBLICATIONS

Kensington Intros New Mobile Devices, iPhone and iPod Dock, published Aug. 10, 2009, Digital Tech News—Digital Technology & Consumer Electronics, downloaded from the World Wide Web at http://www.digitaltechnews.com/news/2009/08/kensington-intros-new-mobile-devices-iphone-and-ipod-dock-.html.

"Magician LT C99 Dual Screen, Dual Sim, Touch Mobile," downloaded from the World Wide Web at http://othree.in/proddetail.asp?prod=Touch1, visited Oct. 15, 2009.

Microsoft's Innovative Patent Idea of Smart Desktop Docking Station for Mobile Devices, retrieved Jan. 15, 2010, downloaded from the World Wide Web at http://www.mydigitallife.info/2009/02/01/microsofts-innovative-patent-idea-of-smart-desktop-docking-station-for-mobile-devices/.

Mobile High-Definition (Mh1™) Link Technology, Silicon Image, Inc., Technology Brief, retrieved Jan. 15, 2010, downloaded from the World Wide Web at http://www.siliconimage.com/docs/MHL_Tech_Brief_FINAL_101509.pdf.

"Nokia's Dual Screen Handheld Concept Comes with Removable Keyboard," retrieved may 25, 2007, downloaded from the World Wide Web at http://www.gizmodo.com.au/2007/05/nokias_dual_screen_handheld_co/#more-246942.

"Nokia E97 Concept, Inspired by Paper Mail and based on E-Ink Technology," downloaded from the World Wide Web at http://www.concept-phones.com/nokia/nokia-e97-concept-inspired-paper-mail-based-eink-technology/, visited Oct. 22, 2009.

Review: Motorola Droid for Verizon, Cell Phones & Mobile Device Technology News, published Nov. 6, 2009, downloaded from the World Wide Web at http://www.geek.com/articles/mobile/review-motorola-droid-for-verizon-2009116/.

"WND Atom Van Gogh," downloaded from the World Wide Web at http://wvvw.wndtelecom.com/en/mobile/Atom-VG10/, visited Oct. 22, 2009.

"Yanko Design, Form Beyond Function—Another Touchscreen, but wait this one has a surprise!," downloaded from the World Wide Web at http://www.yankodesign.com/2008/03/06/another-touchscreen-phone-but-wait-this-one-has-a-surprise/, visited Oct. 22, 2009.

Written Opinion, issued in PCT/US2010/059112 dated Aug. 8, 2011, 4 pages.

International Search Report and Written Opinion issued in corresponding PCT Application No. PCT/US2011/027995, dated Oct. 25, 2011, 11 pages.

* cited by examiner

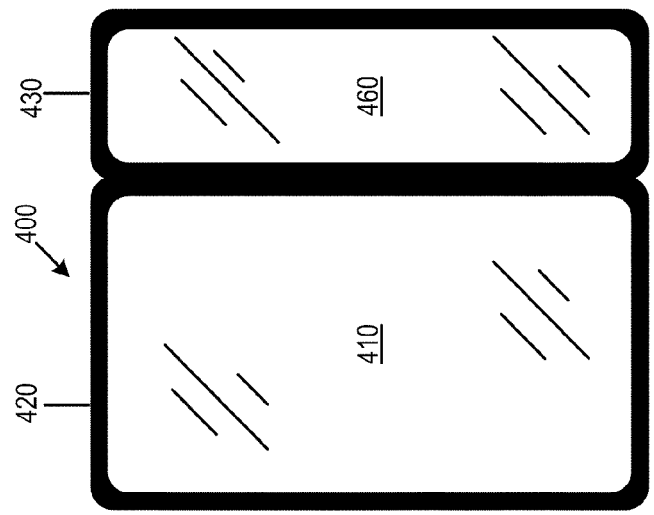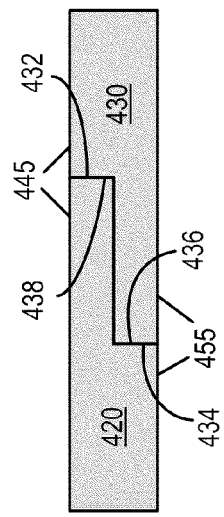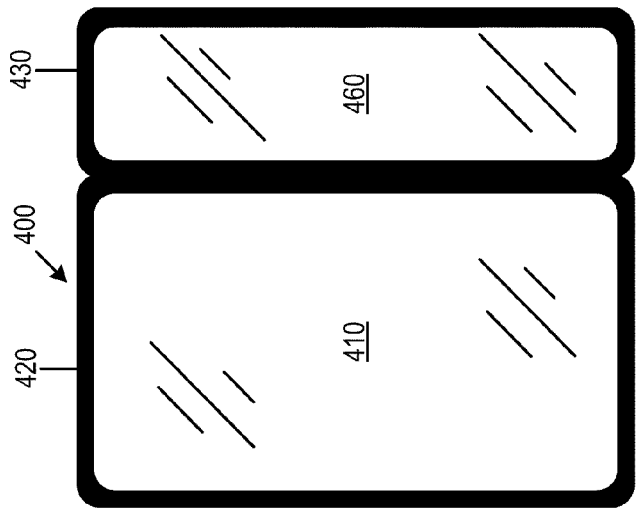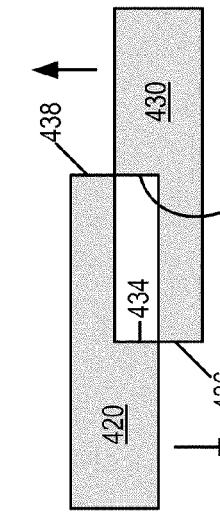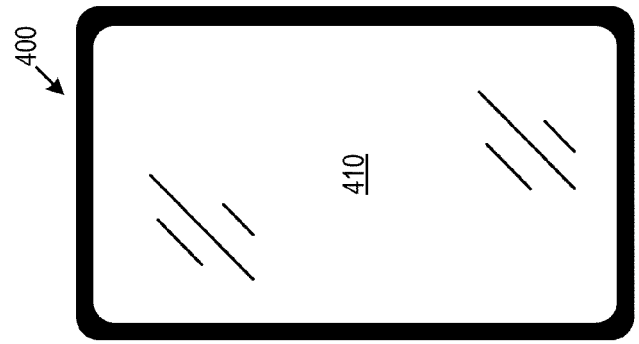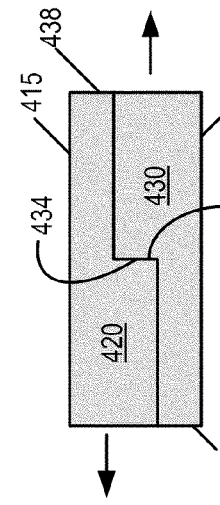
FIG. 4(a)  FIG. 4(b)  FIG. 4(c)

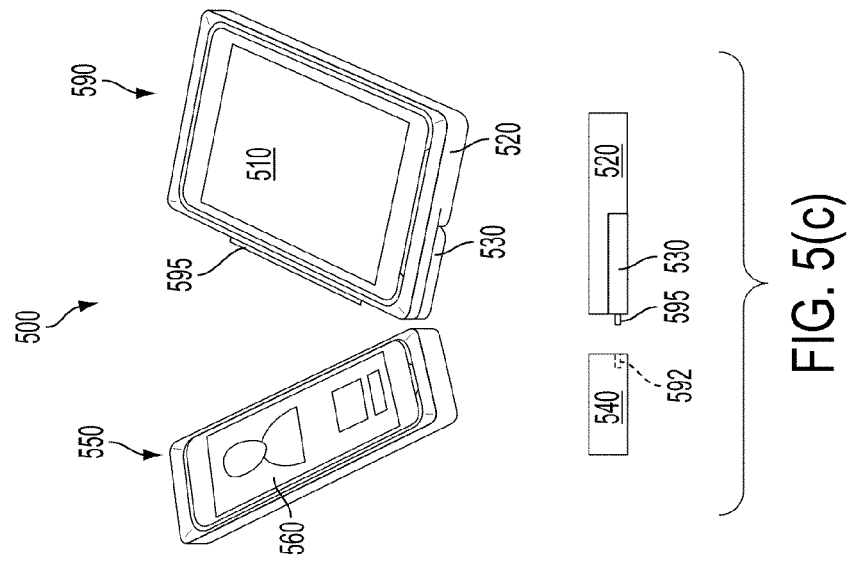
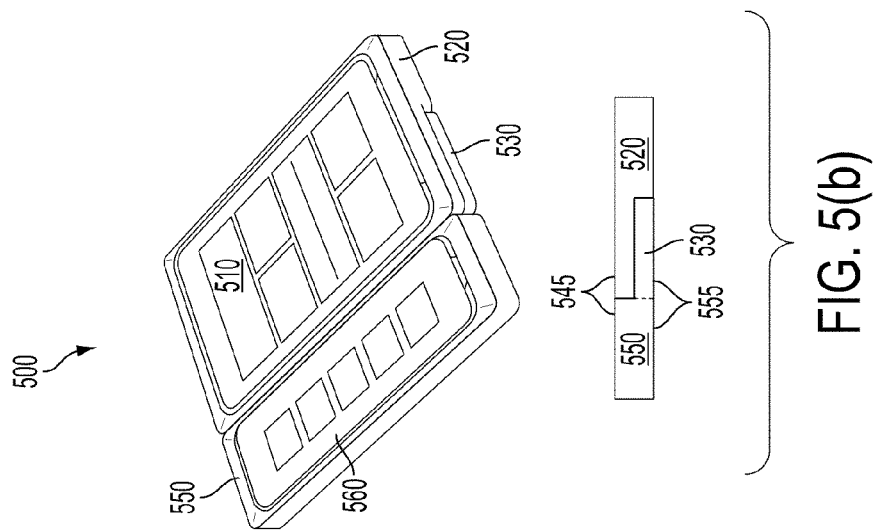
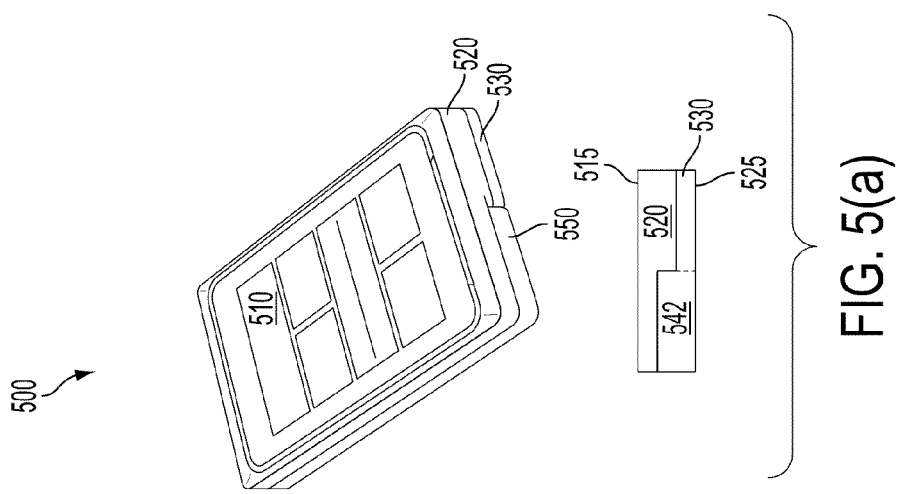

MOBILE COMMUNICATION DEVICE HAVING MULTIPLE, INTERCHANGEABLE SECOND DEVICES

FIELD

The present disclosure relates to mobile communication devices, and, more particularly, to mobile communication devices having multiple, interchangeable second devices.

BACKGROUND

Modern mobile phones have evolved over recent years to the point where they now possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run web browser, navigation system, media player and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. This is not desirable, as users want their mobile phone to fit comfortably in their hand or in a shirt or pants pocket.

Another limitation of modern mobile phones is that a user typically cannot use a phone's full capabilities while on a phone call. This is because, for example, a user cannot see a phone's display when the phone is held up to his or her ear. Separate earpieces, earbuds or wireless headsets may allow a user to view a mobile phone display and utilize "non-phone" functions while on a call, but these peripheral components have their disadvantages. A user needs to keep track of these additional components and wireless headsets must be charged prior to use. Further, some users simply do not like to wear headsets. As another option to view a display while making a call, a user can utilize a mobile phone's speakerphone mode. However, this mode often involves notably increasing the speaker volume. Thus, the privacy of the call is lost if anyone else is within hearing distance. Further, as the mobile phone speaker can be a more than a foot or two away from the user's ear, it may be more difficult to hear the speaker over any ambient noise.

Accordingly, it is desirable to provide a mobile communications device that is sized for convenience and yet allows the user to utilize the full functionality of the device.

SUMMARY

A handheld mobile communication device is disclosed that has interchangeable parts and that allows a user to utilize the full capabilities of the device while conducting a private phone call.

In one embodiment, the mobile phone includes two displays on two separate devices. The separate devices can be attached and the two displays can be used as an integrated display or the devices can be detached and the devices can communicate wirelessly with each other.

In another embodiment, the mobile phone can control or deliver content to various external devices. For example, the mobile phone can operate as a content server for one or more external media players or computing systems. Either the first device or a second device can operate as a content server.

In still another embodiment, the mobile phone can comprise more than one interchangeable second devices. The second devices can include a battery, a virtual keyboard, one or more game controllers and one or more devices that can operate as mobile phone handsets. The first device can wirelessly communicate with more than one second device simultaneously.

These and other aspects, features and advantages of the technology will become apparent from the following description and referenced drawings.

BRIEF DESCRIPTION OF THE DRAWINGS

FIG. 4(a) shows top and side profiles of an exemplary dual display mobile device in a closed configuration.

FIG. 4(b) shows top and side profiles of an exemplary dual display mobile device in an intermediate position between open and closed configurations.

FIG. 4(c) shows top and side profiles of an exemplary dual display mobile device having planar front and back surfaces in a closed configuration.

FIG. 5(a) shows perspective and side profile views of an exemplary dual display mobile device in a closed, attached configuration.

FIG. 5(b) shows perspective and side profile views of an exemplary dual display mobile device in an open, attached configuration.

FIG. 5(c) shows perspective and side profile views of an exemplary dual display mobile device in a detached configuration.

DETAILED DESCRIPTION

As used in this application and in the claims, the singular forms "a," "an," and "the" include the plural forms unless the context clearly dictates otherwise. Additionally, the term "includes" means "comprises."

The described systems, apparatus and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatus can be used in conjunction with other systems, methods and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Figure 1A:
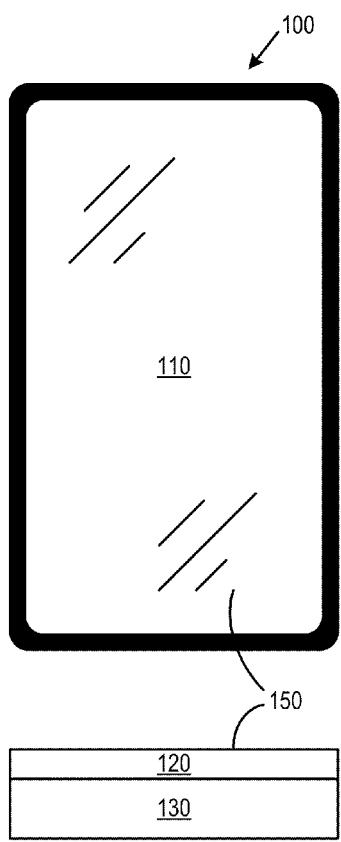
FIG. 1(a) shows top and side profiles of an exemplary dual display mobile device in a closed configuration.
Figure 1B:
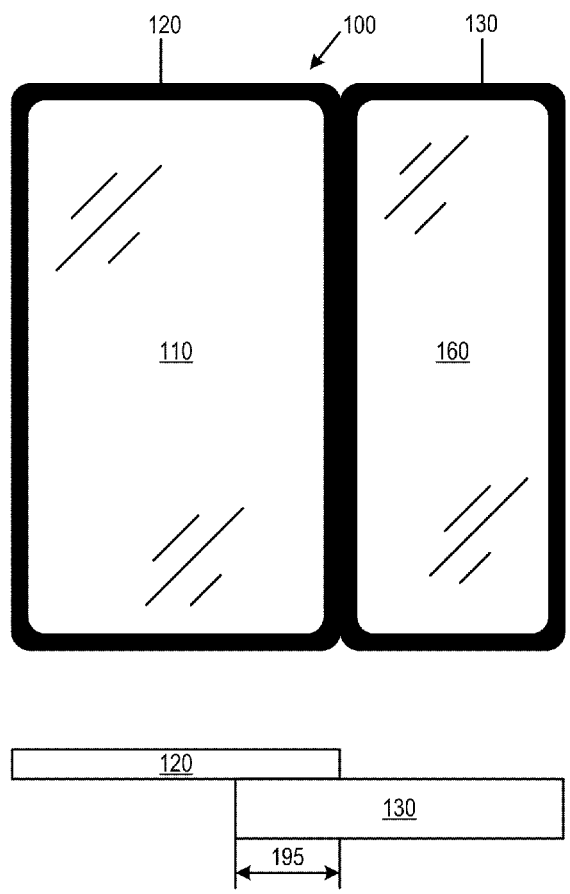
FIG. 1(b) shows top and side profiles of an exemplary dual display mobile device in an open configuration.

Turning now to the drawings, FIGS. 1(a) and 1(b) show an exemplary dual display mobile communication device (mobile device) 100 comprising a first portion 120 and a second portion 130. The first portion 120 comprises a first display 110 and the second portion 130 comprises a second display 160. The mobile device 100 is capable of mobile telecommunications (telephony, multi-media messaging (MMS), data transmission, etc.) over a mobile communication network (cellular, satellite, etc.). The mobile device 100 can run standard productivity software such as email, calendar and address book programs, as well as being able to operate as a web browser, gaming system, media player, photo gallery and/or navigation system, to provide several examples. The mobile device 100 can be configured to download and execute a wide variety of additional applications. The mobile device 100 can be GPS-enabled, allowing applications to take advantage of the mobile device's location.

FIG. 1(a) shows the dual display mobile device 100 in a closed configuration or position in which the first portion 120 can be arranged in front of, or on top of, the second portion 130. In the closed configuration, the mobile device 100 can fit comfortably in a person's hand or in a shirt, pants or coat pocket. In the closed configuration, the first display 110 can be exposed (i.e., viewable to a user) and the second display 160 can be hidden from view. In this example, the first display 110 occupies a large portion of the front surface 150 of the mobile device 100. In other embodiments, the first display 110 can comprise a smaller portion of the first surface 150 to allow room for various input devices such as a track ball, physical keyboard or one or more buttons. These buttons can be programmed to perform a variety of tasks such as returning to a home page or launching a specific application. The displays 110 and 160 can each be a touchscreen capable of detecting input from various objects (finger, stylus, etc.) in contact and/or in proximity with the display.

FIG. 1(b) shows the mobile device 100 in an open, expanded configuration. The second portion 130 has been moved laterally relative to the first portion 120 to expose the secondary display 160. The mobile device 100 in the open configuration has a wider profile than in the closed configuration, but can still be held in a person's hand. The first and second portions 120 and 130 are connected physically and electronically in the open and closed configurations. The electrical connection between the first portion 120 and the second portion 130 can be made via a flex cable or other well-known electrical connection mechanism.

In this example, the first portion 120 is shown as being thinner than the second portion 130. In such a configuration, most of the electrical components comprising the mobile device 100 reside in the second portion 130. In other embodiments, the first portion 120 and the second portion 130 can have varying relative thicknesses. That is, the first portion 120 and the second portion 130 can have substantially the same thickness, or the first portion 120 can be thicker than the second portion 130. When the mobile device 100 is in the open configuration, the first portion 120 and the second portion 130 remain overlapped by a distance 205. Accordingly, the width of the second display 160 is generally narrower than that of the first display 110. The mobile device 100 can contain additional features such as an on/off switch, volume controls, a speaker, a microphone and input/output ports for sending and/or receiving data and/or for recharging the power supply of the mobile device 100.

In some embodiments, the mobile device 100 can be configured such that the second portion 130 can be removed and replaced with a different component. For example, a user about to embark on a long airplane flight can replace the second portion 130 with an extra battery to extend the operating time of the mobile device 100. The second portion 130 can be replaced with various other components such as a game controller, battery or physical keyboard. These additional components can be arranged behind the first portion when the mobile device is in a closed configuration. To re-close the mobile device 100, the user can push both portions 120 and 130 in opposite directions and towards one another to make portion 130 slide beneath portion 120.

Figure 2A:
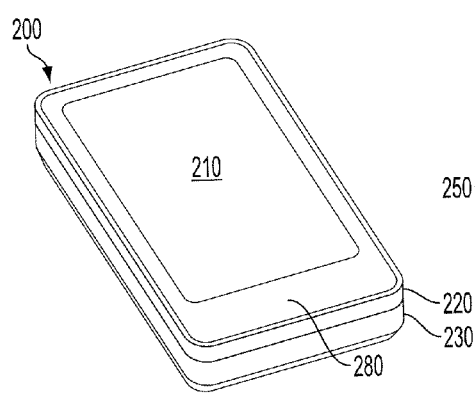
FIG. 2(a) shows a perspective view of an exemplary dual display mobile device in a closed, attached configuration.

FIGS. 2(a)-2(d) show an exemplary dual display mobile device 200 comprising a first device 290 and a removable second device 250. The first device 290 comprises a first display 200, a first portion 220 and a second portion 230 (excluding the second device 250). The second device 250 comprises a second display 260 and can be stored in the second portion 230. The first portion 220 and the second portion 230 can move laterally relative to each other to transition between the open and closed configurations of the mobile device 200. FIG. 2(a) shows the mobile device 200 in a closed, attached configuration in which the second device 250 can be stored within a well or pocket 240 in the second portion 230. The first display 200 can be exposed and the second display 260 can be hidden from view.

Figure 2B:
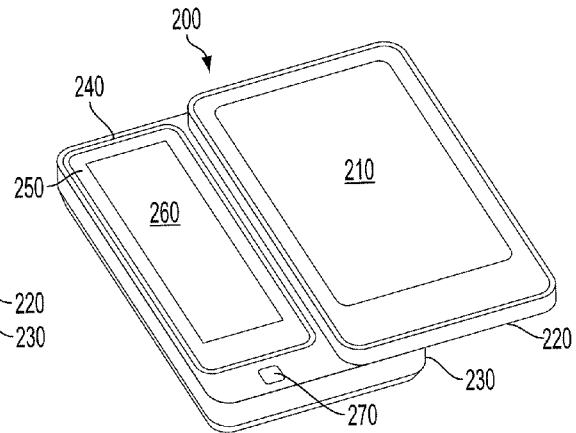
FIG. 2(b) shows a perspective view of an exemplary dual display mobile device in an open, attached configuration.

FIG. 2(b) shows the mobile device 200 in an open, attached configuration in which the first portion 220 has been moved laterally relative to the second portion 230 to expose the second device 250. In this example, the second device 250 can be stored within a well 240 of the second portion 230. The second device 250 can be releasably secured within the well 240 by way of, for example, a mechanical catch (not shown). The second device 250 can be released from the first device 290 by, for example, pressing a button 270 or other release mechanism. Regardless of the mechanism used to secure the second device 250 to the first device 290, the mechanism prevents the second device 250 from being unintentionally separated from the second portion 230. In other embodiments, the second device 250 can be secured within the well 240 by magnets, latches, clasps or other known techniques for releasably attaching one component to another.

Figure 2C:
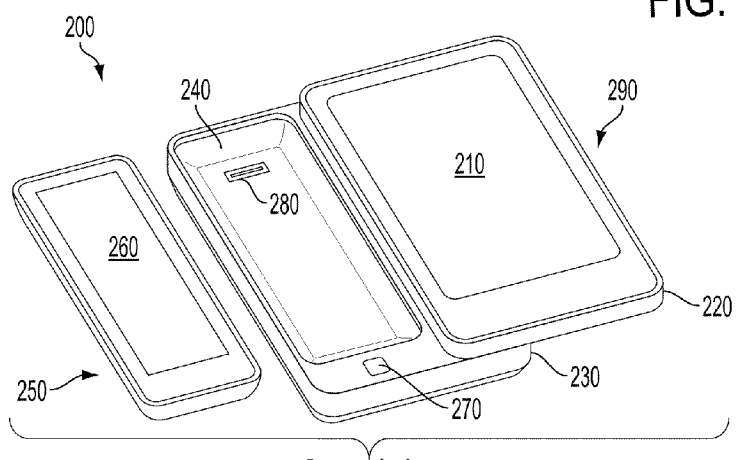
FIG. 2(c) shows a perspective view of an exemplary dual display mobile device in an open, detached configuration.

FIG. 2(c) shows the dual display mobile device 200 in an open, detached configuration in which the second device 250 has been detached from the first device 290. In this example, detaching the second device 250 from the first device 290 reveals an electrical connector 280 in the base of the well 240. The electrical connector 280 mates with a complementary electrical connector in the second device 250 (not shown) to allow for electronic communication between the first and second devices 290 and 250. The electrical connector 280 can be, for example, a USB connector or any other type of electrical connector. The electrical connector can also allow the first and second connector to be recharged using a single power supply. The electrical connector 280 can be located at any position within the well 240. Components other than the second device 250 can be stored in the well 240. For example, the well 240 can store an extra battery, physical keyboard or game controller.

Figure 2D:
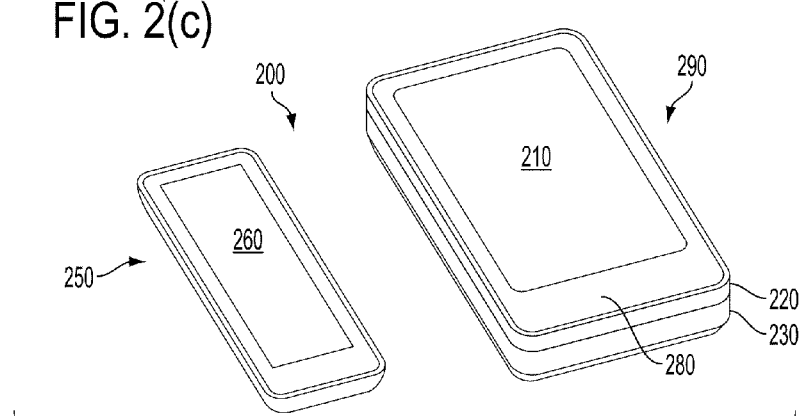
FIG. 2(d) shows a perspective view of an exemplary dual display mobile device in a closed, detached configuration.

FIG. 2(d) shows the mobile device 200 in a closed, detached configuration. The first portion 220 can be arranged in front of the second portion 230, similar to the closed attached configuration shown in FIG. 2(a). As discussed in detail below, the first device 290 and the second device 250 can communicate wirelessly to operate in a coordinated fashion, or, the two devices can operate independently of each other.

Figure 3A:
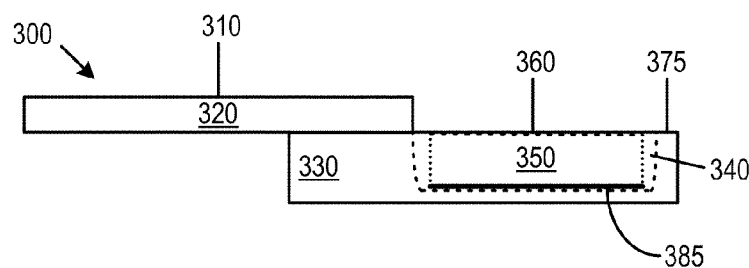
FIG. 3(a) shows a side profile of an exemplary dual display mobile device in an open, attached configuration with a second device in a lowered position.
Figure 3B:
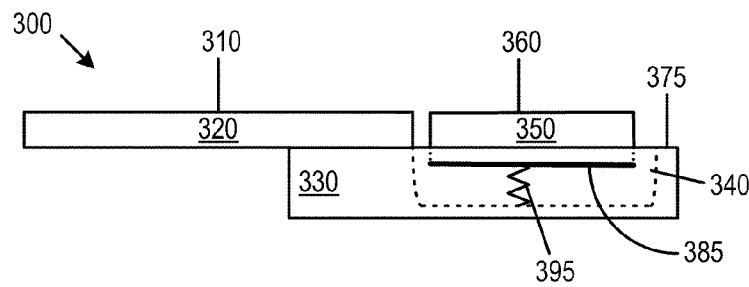
FIG. 3(b) shows a side profile of an exemplary dual display mobile device in an open, attached configuration with a second device in a raised position.

FIGS. 3(a)-3(b) shows an exemplary dual display mobile device 300 comprising a second device 350 that can be raised to make a second display 360 flush with a first display 310. The mobile device 300 comprises a first portion 320 and a second portion 330. A second display 360 that can be positioned flush with the first display 310 can make a user feel like the two displays are a single integrated display. The first portion 320 comprises the first display 310 and the second portion 330 comprises a well 340 capable of storing the second device 350. The second device 350 comprises the second display 360.

FIG. 3(a) shows the second device 350 in a lowered position in which the surface of the second display 360 is flush with a top surface 375 of the second portion 330. FIG. 3(b) shows the second device 350 in a raised position in which the second device 350 is raised relative to the second portion 330 and the surface of the second display 360 is flush with the surface of the first display 310. The second device 350 can move between the lowered and raised positions by, for example, the use of a spring-loaded panel 385 connected to the second portion 330 by a spring 395. When the second device 350 is in the lowered position, the spring 395 can be compressed and the spring panel 385 can be held in place by, for example, a mechanical latch or other mechanism. The latch can be released, allowing the spring 395 to extend and lift the second device 350 into the raised position. Repeatedly pressing on the second device 350 can alternately engage and disengage the release mechanism, allowing the second device to move between the lowered and raised positions. Other mechanisms can be used to make the two displays flush. For example, a bottom of the second portion 330 can have a cut out that can be moved up or down through upward or downward pressure exerted on the cut out by a user.

FIGS. 4(a)-4(c) show an exemplary dual display mobile device 400 having planar front and back surfaces in both open and closed configurations. The mobile device 400 comprises a first portion 420 and a second portion 430. The first portion 420 comprises a first display 410 and the second portion 430 comprises a second display 460. FIG. 4(a) shows the mobile device 400 in a closed configuration with the second portion hidden beneath the first portion. A front surface 415 and a back surface 425 of the mobile device 400 are substantially flat, or planar. For example, the first and second portions 420 and 430 have similar L-shaped cross-sections and are physically and electronically connected in both the open and closed configurations.

The first and second portions 420 and 430 can move relative to each other along at least two dimensions, as indicated by the arrows in FIGS. 4(a) and 4(b). For example, the first and second portions 420 and 430 can slide horizontally relative to each other, as shown by the arrows in FIG. 4(a), to transform the mobile device 400 from the closed configuration shown in FIG. 4(a) to the intermediate position shown in FIG. 4(b). Thus, sliding the second portion 430 from out behind the first portion 420 exposes the second display 460. The two portions can also slide vertically relative to each other, as indicated by the arrows in FIG. 4(b), to transition the mobile device 400 from the intermediate position to the open configuration shown in FIG. 4(c). Thus, transforming the mobile device 400 from a closed configuration to an open configuration involves either sliding the first portion 420

"over and down" relative to the second portion 430, or sliding the second portion 430 "over and up" relative to the first portion 420.

The complementary L-shaped cross-sections of the first and section portions 420 and 430 allow for flat or planar front and back surfaces 445 and 455 when the mobile device 400 is in an open configuration, and for planar front and back surfaces 415 and 425 when the device is in a closed configuration. The L-shaped cross-sections can provide for front and back surfaces that do not have any gaps between the first and second portions 420 and 430 in the open configuration. That is, edges 438 and 434 of the first portion 420 are immediately adjacent to edges 432 and 436 of the second portion 430, respectively, in the open configuration.

A dual display mobile device having planar front and back surfaces in both open and closed configurations is more desirable to use. For example, flush first and second displays are easier to view than first and second displays that are vertically displaced from each other. Further, a user can more easily apply touch gestures, such as ("drag and drop," "pinch to zoom," etc.) across flush displays. Furthermore, a mobile device with a planar back surface is less prone to wobbling when a user is providing touch input to the device, which allows for quicker and more reliable input. Moreover, a planar back surface allows the first and second displays to be presented parallel to the surface of the object upon which the mobile device is resting. That is, the device will not tip away from or toward the user when the device is placed on a flat surface. In other embodiments, the cross-sections of the first and second portions can possess shapes other than the L-shape shown in FIGS. 4(a)-4(c).

FIGS. 5(a)-5(c) show an exemplary dual display mobile device 500 comprising a first device 590 and a second device 550. The first device 590 comprises a first display 510, a first portion 520 and a second portion 530. The mobile device 500 has substantially planar front and back surfaces 515 and 525, respectively, in a closed configuration and planar front and back surfaces 545 and 555, respectively, in an open configuration. The second portion 530 can move relative to the first portion 520 in at least two dimensions to transition between open and closed configurations. The second device 550 can be attached to the second portion 530 in the open and closed configurations, and can move relative to the first portion 520 together with the second portion 530.

FIG. 5(a) shows the mobile device 500 in a closed, attached configuration with the second device 550 arranged behind or beneath at least part of the first portion 520. In this example, the first display 510 is exposed in the closed configuration. The second display 560 is hidden from view. FIG. 5(b) shows the mobile device 500 in an open, attached configuration in which both the first display 510 and the second display 560 are exposed or visible. FIG. 5(c) shows the mobile device 500 in a detached configuration in which the second device 550 is detached from the first device 590. As described further below, in the detached configuration, the first and second devices communicate wirelessly there between.

In this example, the second device 550 is attached to the second portion 530 by a connector. As shown in FIG. 5(c), the connector can comprise a male connector portion 595 that is part of the second portion 530 and a female connector portion 592 that is part of the second device 550. The male connector portion 595 can comprise pins that fit into sockets of the female connector portion 592. Alternatively, the male connector portion 595 could be integrated into the second device 550 and the female connector portion 592 could be integrated into the first device 590. In addition to providing a physical connection, the connector can provide an electrical connection between the first and second devices 590 and 550 for communication electrically there between. The connector can be any known mechanism for providing a physical and electrical connection between devices. In some embodiments, the first and second devices can be separated by pulling the devices apart. In other embodiments, the devices can be separated by sliding the devices relative to each other, and then pulling them apart. In yet other embodiments, the devices can be physically connected by the use of magnets or any releasable mechanical couplers.

The second device 550 can be replaced by various other components to provide additional functionality or features. For example, a physical keyboard, game controller, extra battery or other component can be attached to the first device 590 instead of the second device 550. These components can have the same profile as the second device 550 so that they can be stowed behind the first device 590 when the mobile device 500 is in a closed configuration. In any of the examples described herein, the second display can be arranged either to the left or to the right of the first display when the mobile device is in an open configuration.

In other embodiments, a component having a display larger than the display 560 can be attached to the first device 590 to allow for an even larger combined display (first display plus second display) than that shown in FIG. 5(b). In other embodiments, multiple displays can be attached to the first device 590, for example, in a daisy-chain fashion, to create large combined displays. In some embodiments, first or second devices of other mobile devices as described herein can be attached to the first device 590.

In any of the examples described herein, the second display of a mobile device, when exposed, can operate as an extension of the first display. That is, the first and second displays can act together to create an effective larger, single integrated display, or a shared display. By being integrated, items from the first display can be moved to the second display via drag-and-drop operations. Additionally, applications and images can span both displays to provide the experience of a single unitary display. Or, clicking an application icon on one display can open the application on the other display. The increased display area provides a richer user experience.

Figure 6:
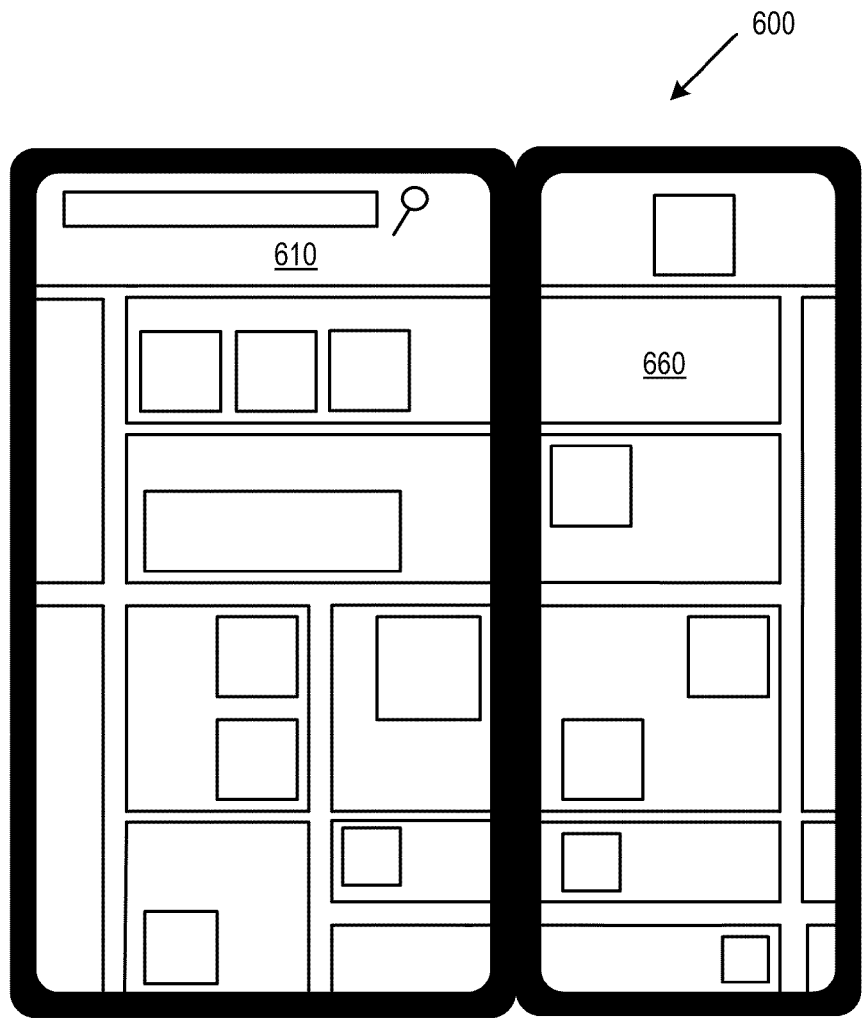
FIG. 6 shows a top view of an exemplary dual display mobile device running a map application displayed on first and second displays operating as a shared display.

FIG. 6 shows an exemplary dual display mobile device 600 displaying the output of a map or navigation application across a first display 610 and a second display 660. In any of the examples described herein, one or both of the first and second displays can be updated in response to input received at one or both of the displays. For example, with reference to FIG. 6, in response to the detection of a multi-touch "pinch" gesture (two fingers touching the display moving toward each other) on the first display 610, the mobile device 600 can update both the first and second displays 610 and 660 to zoom out from the selected map area. The mobile device 600 can zoom in, zoom out, rotate the map or perform other operations in response to multi-finger gestures detected on the first display 610, the second display 660 or both displays (e.g., one finger touching the first display and a second finger touching the second display). The mobile device 600 can perform operations in response to multi-finger gestures in an application programmed to respond to such gestures. Further, the mobile device 600 can be configured to perform operations in response to single finger gestures that begin on one display and end on the other display. Furthermore, the mobile device 600 can perform operations associated with "flick" gestures, quick, linear movements by a finger, stylus, etc., received at one or both of the displays.

Figure 7:
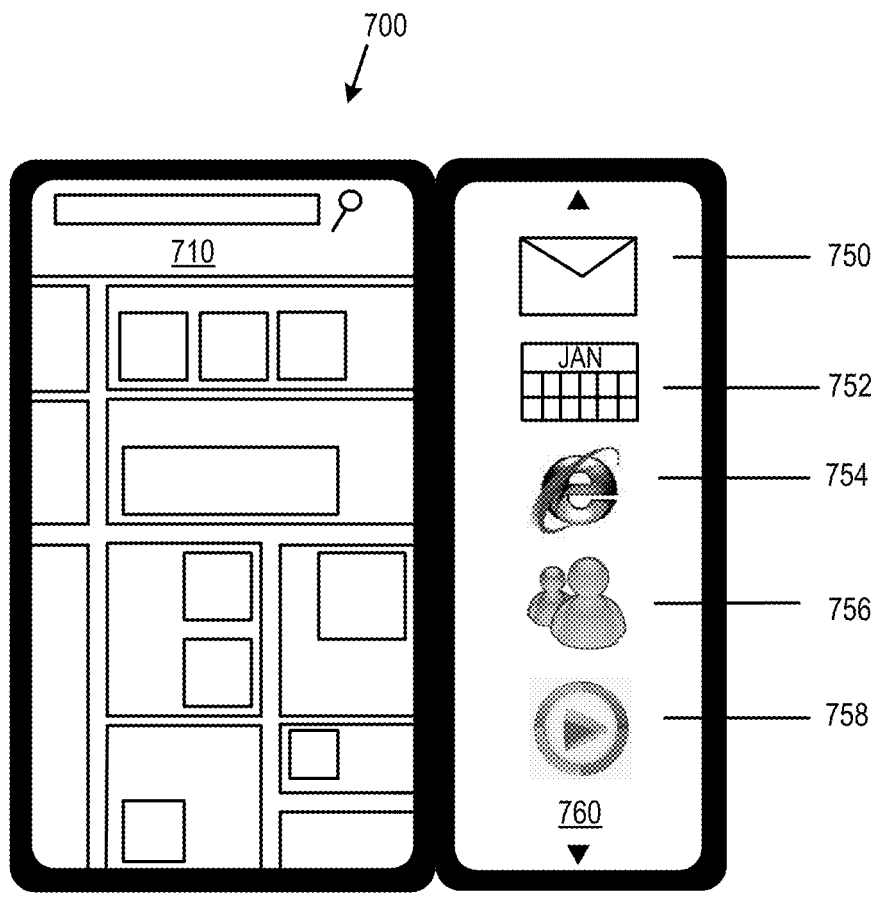
FIG. 7 shows a top view of an exemplary dual display mobile device with the first display showing the output of a map application and the second display showing application icons.

The first and second displays can display related or associated information in other manners. FIG. 7 shows an exemplary dual display mobile device 700 in an open configuration with a first display 710 and a second display 760. In this example, the output of an application running on the mobile device 700 (in this case, a map or navigation application) is shown on the first display 710, and a list of icons 750, 752, 754, 756 and 758 associated with various applications (email, calendar, web browser, text messenger, media player, etc.) is shown on the second display 760. The mobile device 700 can update one or both of the displays based on input received from the other or both displays. For example, in response to a user touching the portion of the second display 760 associated with the email icon 750, the mobile device 700 can launch an email application and direct its output to the first display 710. This allows the icons to remain visible despite the application opening. In another example, the first display 710 can display the output of an email program or other application that requires text input, and the second display 760 can operate as a virtual keyboard. In such a configuration, as the user taps the second display 760 to compose a message, the associated text can appear at the first display 710.

The first and second displays 710 and 760 can display related information in additional manners. For example, the secondary display 760 can display information that is supplemental or complementary to that displayed on the first display 710. For instance, the second display 760 can display directions for a map route shown on the first display 710, or display a reading pane for an email application displayed on the first display 710. In another example, the device 700 can be configured to allow a user to interact with the second display 760 to browse a media gallery (photo, audio, video, etc.) and select media files for inclusion into an email message, text media or other communication being composed at the first display 710. A user can select the media files for inclusion into the communication, for example, by tapping an icon displayed on the second display 760 or by dragging an icon from the second display 760 to the first display 710. The second display 760 can also notify a user of an incoming phone call, text or calendar appointment. In any event, the first and second displays can display related content (e.g., text, images, etc.)

In another example, with reference to FIG. 5(b), a first display 510 can display a home or main page that shows, for example, the user's current location, local time, upcoming calendar appointments, number of unread email and MMS messages, and number of voice messages. The second display 560 could display a list of icons 555 associated with various applications. In any of the examples described herein, the first and second displays can operate independently when attached. For example, in any open, attached configuration, the first display and second displays can each display the output of a separate application.

In any of the examples described herein, the first and second devices can interact as long as they are within wireless communication range of each other. For example, the display of a detached second device can display information that is supplemental or complementary to, or that otherwise is associated with or corresponds to, the information shown on the first display. For instance, the first and second displays can display the output of a single application, the second display can present information related or supplemental to an application displayed in the first display, the first display can display information related to an application running on the second device, or the second display can display a list of icons of applications that can. Additionally, the first and second displays can display identical information for presenting content to a person holding the other display. For example, an identical series of photograph images can be displayed on both displays and advancement on the first display due to user input can result in the automatic updating of the second display.

Figure 8:
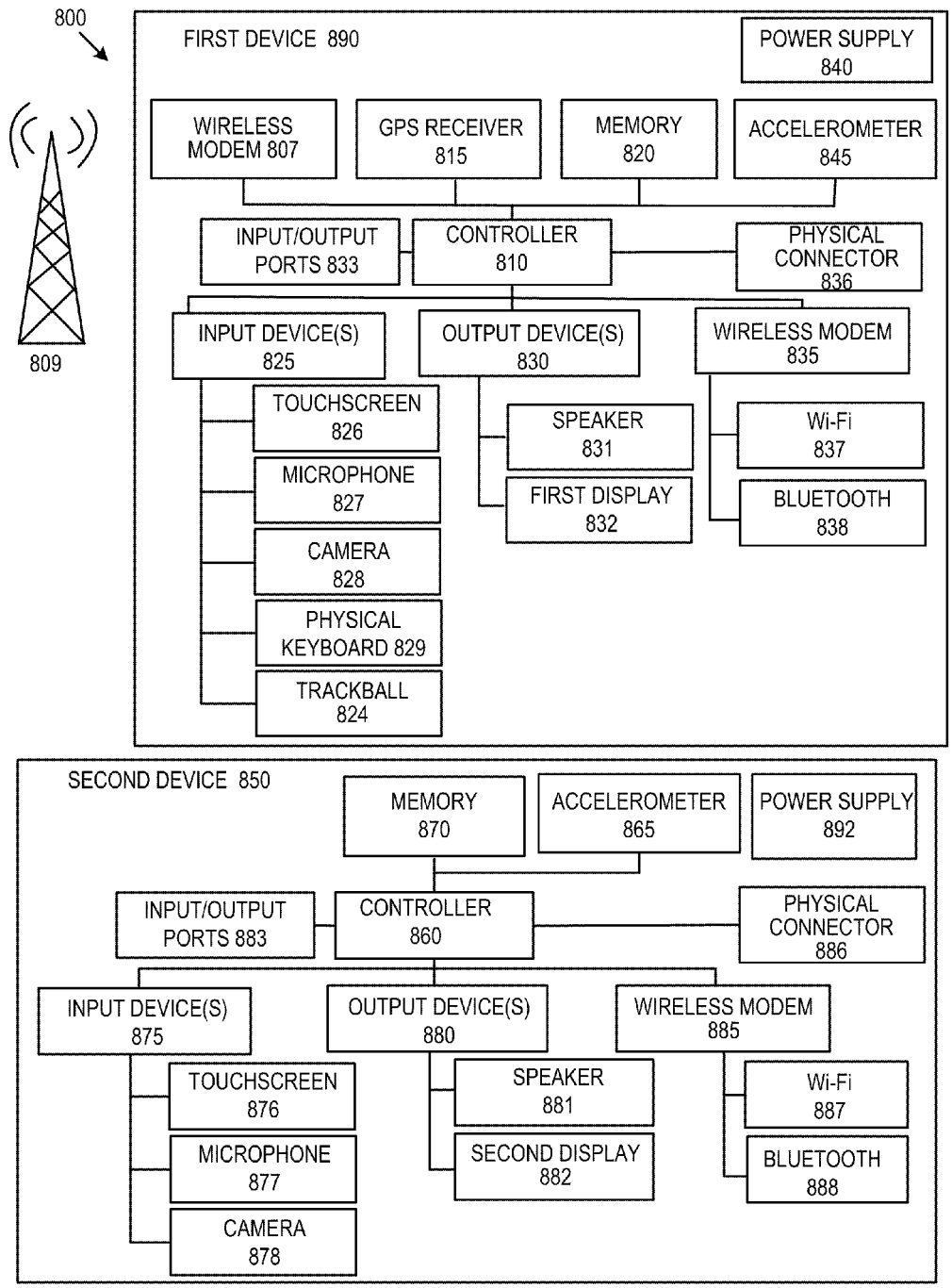
FIG. 8 is a flowchart of an exemplary dual display mobile device showing hardware components.

FIG. 8 is a flowchart of a dual display mobile device 800 comprising a first device 890 and a detachable second device 850. The first device 890 comprises a controller or processing unit 810, memory 820, one or more input devices 825, one or more output devices 830, at least one input/output port 833, a power supply 840, and a physical connector 836. The first device 890 also comprises a wireless modem 807 (e.g., a cellular modem) for communicating with one or more mobile communication networks 809 and a wireless modem 835 for communicating with the second device 850. The mobile communication network 809 can be a cellular, satellite or other type of mobile communication network. The first device 890 can further comprise a Global Positioning System (GPS) receiver 815 and/or an accelerometer 845. Each component in the first device 890 can communicate with any other component, although only connections between the controller 810 and other components are shown. The power supply 840 typically comprises a rechargeable battery. The one or more input devices 825 can include, for example, a touchscreen 826, microphone 827, camera 828, physical keyboard 829 and/or trackball 824. The one or more output devices 830 can include, for example, a speaker 831 and first display 832. A first device 800 comprising a microphone 827 and a speaker 831 can have the microphone 827 and the speaker 831 arranged such that the first device 800 can be used as a mobile phone handset or headset. That is, when such a first device 800 is positioned near a user's head, the microphone 827 is near the user's mouth and the speaker 831 is near the user's ear. The first device 890 can include additional input and/or output devices. The physical connector 836 physically connects the first device 890 to the second device 850.

The second device 850 comprises a controller or processing unit 860, memory 870, one or more input devices 875, one or more output devices 880, at least one input/output port 883, a power supply 892, a physical connector 886, and a wireless modem 885 for communicating with the first device 890. The second device 850 can further comprise an accelerometer 865. Each component in the second device can communicate with any other component in the second device, although only connections between the controller 860 and other components are shown in FIG. 8. The one or more input devices 875 can include, for example, a touchscreen 876, microphone 877 and camera 878. The second device 850 can include additional input devices such as a physical keyboard or trackball. The one or more output devices 880 can include, for example, a speaker 881 and a second display 882. A second device 850 comprising a microphone 877 and a speaker 881 can be configured such that the second device 850 can be used as a mobile phone handset. That is, when such a second device 850 is positioned near a user's head, the microphone 877 is near the user's mouth and the speaker 881 is near the user's ear. The physical connector 886 can be configured to mate with the physical connector 836 of the first device to physically and electronically connect the two devices.

The power supply 892 typically comprises a rechargeable battery. The rechargeable battery can be charged when the second device 850 is attached to the first device 890 so that a single power source charges both batteries. In some embodiments, the first device 890 can charge the power supply 892 when the power supply 840 is being recharged (for example, when the first device 890 is docked at a charging station). In other embodiments, either device can be powered by its own power supply, the power supply of the other device, or a combination of both. In still other embodiments, the power supply of either device can be recharged by the power supply of the other device. The conditions under which one device is powered or recharged by the other device can be determined, for example, by default settings established during manufacture, or through user-configurable settings. The first and second devices can each be powered by an external power supply.

The wireless modems 835 and 885 of the first and second devices 890 and 850, allow for wireless communication between the devices. The wireless modems 835 and 885 can each comprise a Bluetooth modem 838, a Wi-Fi modem 837 and/or any other hardware capable of providing a wireless communication link. The wireless modems 835 and 885 can each also communicate with other wireless-enabled devices within communication range of the first and second devices 890 and 850. For example, the wireless modems 835 and 885 can provide a communication link from the first or second device 890 or 850 to a nearby personal computer, printer, media player, mobile phone or other devices capable of wireless communication. In some embodiments, the first device 890 can act as a relay or base station to enable communication between a second device and another wireless device. The wireless modems 835 and 885 can comprise both a Wi-Fi modem 837 and a Bluetooth modem 838. In this case, the first or second device can be configured to switch between the two modems to take advantage of the greater communication range typically provided by Wi-Fi modems and the reduced power consumption typically provided by Bluetooth modems.

The first and second devices 890 and 850 can also comprise accelerometers 845 and 865, respectively. The first and second devices 890 and 850 can be configured to use an accelerometer, for example, to detect the orientation of the device and adjust the output sent to the first and second displays accordingly. The accelerometers 845 and 865 enable additional features. For example, the first and second devices can each be configured to perform operations in response to a user gesturing with either device. For example, a device can perform various operations in response to a user waving or shaking the device. One example of using the device in response to movement is a gaming application, as discussed further below.

The at least one input/output ports 833 and 883 of the first and second devices can each include at least one output port. The output port can output audio and/or video data to, for example, a set of speakers (headphones), a stereo receiver, a television or other media player. The audio or video data can be output in analog and/or digital format. The input/output ports 833 and 883 can each also include a port for communicating data with any external device such as a personal computer, printer, etc.

The memories 820 and 870 of the first and second devices can be volatile memory (e.g., registers, cache, RAM), non-volatile memory (e.g., ROM, FPGA, PAL, CPLD, EEPRAM, flash memory), or some combination of both. The memories 820 and 870 can store software implementing any of the functionalities described herein. Typically, operating system software (not shown) provides an operating environment for other software executing in either the first or the second devices 890 and 850, and coordinates activities of the components of the devices.

In other embodiments, the first and second device 890 and 850 can have more or fewer components than those depicted in FIG. 8. For example, the wireless modem 807 responsible for communicating with the one or more mobile communication networks 809 can be located in the second device 850. Alternatively, both the first and second devices can have a wireless modem capable of communicating with the one or more mobile communication networks 809. The first and second devices could also each have more or fewer input or output devices. For example, the second device 850 could have a camera. Further, the second device 850 could comprise a GPS receiver.

Figure 9:
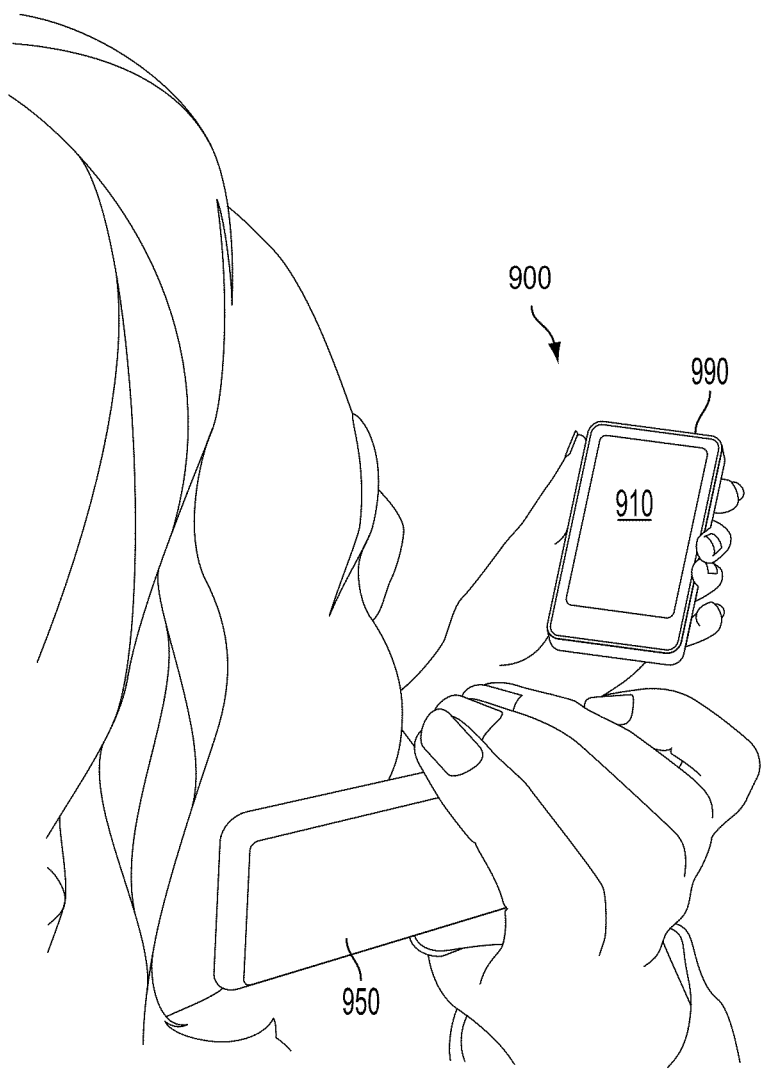
FIG. 9 shows a user operating an exemplary dual display mobile device as a mobile phone with the second device being used as a handset.

FIG. 9 shows a dual display mobile device 900 comprising a first device 990 and a second device 950 being used as a mobile phone. Any of the dual display mobile devices with a detachable second device as described herein provides the user with the ability to conduct a private phone conversation while simultaneously utilizing capabilities of the mobile device unrelated to conducting the mobile phone call ("non-call capabilities"). In FIG. 9, a user has detached the second device 950 from the first device 990 and is holding the second device 950 up to his or her ear with one hand to use the second device 950 as a mobile phone handset to conduct a private call. The first device 990 wirelessly communicates signals associated with a phone call to both a wireless communications network (e.g., a cellular or satellite network) and the second device 950. The second device 950 delivers and receives audio signals associated with the phone call to and from the user.

Simultaneously with using the second device 950 as a mobile phone handset, the user is holding the first device 990 in his or her other hand, and can easily view a first display 910 of the first device 990. Thus, the user can utilize the full capabilities of the mobile device without having to remove the second device 950 from his or her ear. For example, a user can use the first device 990 to look up another person's phone number, check and update their calendar, or access the Internet to read restaurant reviews, search for directions, etc., all while continuing to conduct a private phone conversation. The mobile device can receive the physical location of the calling party or another party to the call. If the mobile device is GPS-enabled, it can also determine its own location, allowing a user to bring up a map showing the location of both the user and another party to the call, and plot a route between the locations on the map. The mobile device 900 can be configured to update the location of the user and another party in real-time both during and after the phone call, and to indicate places of interest along the route. These non-phone capabilities can be utilized without a user having to pause the conversation (in order to perform these tasks using the second device handset 950), or to disrupt the privacy of the call by using the phone's speakerphone mode.

Figure 10:
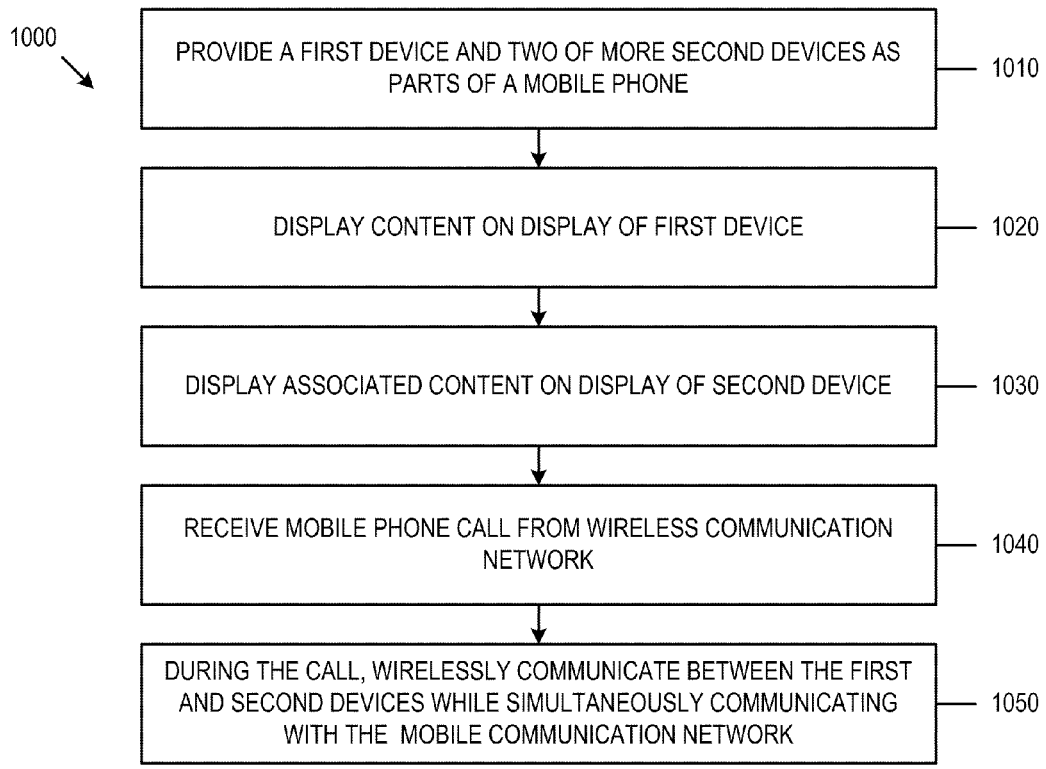
FIG. 10 is a flowchart of a first embodiment of a method of operating a dual display mobile device as a mobile phone.

FIG. 10 is a flowchart of a first embodiment of a method 1000 of operating a dual display mobile device as a phone. The method 1000 can be executed by, for example, a mobile device simultaneously hosting a mobile phone call an application, such as running navigation software. At 1010, first and second devices are provided as parts of a mobile phone. Each device has a display and the two devices can be detached from each other. At 1020, content, such as a navigational route, is displayed on the display of the first device. At 1030, associated content, such as directions for the navigational route, is displayed on the display of the second device. At 1040, a mobile phone call is received from a wireless communication network. At 1050, during the call, the first and second devices wirelessly communicate with each other simultaneous with the mobile device communicating with the mobile communication network. For example, the first device can communicate via cellular modem with the wireless communication network and act as a base station to transmit voice data wirelessly to the second device.

Figure 11:
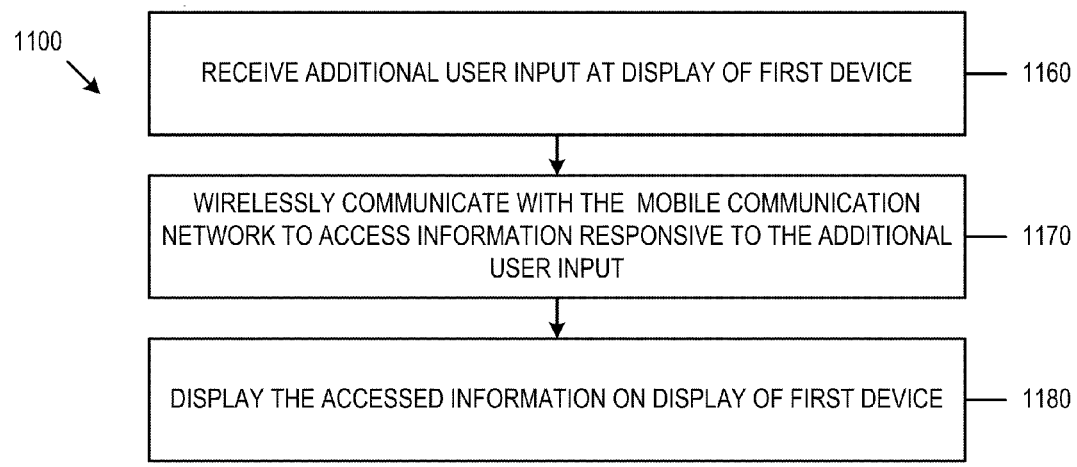
FIG. 11 is a flowchart of additional operations that can be performed as part of the flowchart shown in FIG. 10 for wirelessly communicating with a mobile communication network during a phone call.

FIG. 11 is a flowchart of additional operations that can be performed as part of the flowchart shown in FIG. 10. The additional operations are for wirelessly communicating with a mobile communication network to retrieve information in response to user input received during the mobile phone call. For instance, in the above example, the mobile device simultaneously hosting the call and running navigation software can access the Internet during the call to find the location of a movie theater in response to a user request. At 1160, additional user input, such as a search request for nearby movie theaters, is received at the display of the first device. At 1170, the mobile phone wirelessly communicates with the mobile communication network to access information responsive to the additional input. For example, the mobile phone can access the Internet to retrieve a list of nearby theaters. At 1180, the accessed information, such as the list of theaters or directions to a specific theater, is displayed on the first device display.

Figure 12:
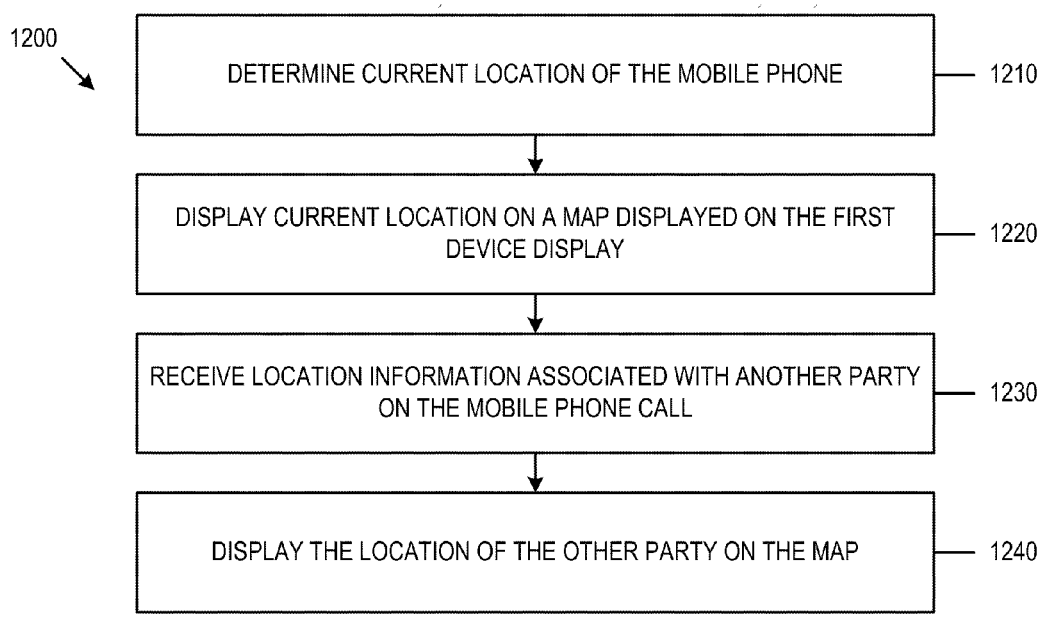
FIG. 12 is a flowchart of additional operations that can be performed as part of the flowchart shown in FIG. 10 for displaying the location of the mobile phone and another party to the call on a map.

FIG. 12 is a flowchart of other additional operations that can be performed as part of the method shown in FIG. 10. The alternative operations are for displaying the location of the mobile phone and another party to the call on a map displayed on the device. For instance, in the above example, the mobile device simultaneously hosting the call and running navigation software can display both its location and the location of another party to the call on a map. At 1200, the current location of the mobile phone is determined. At 1220, the current location of the phone is displayed on the map shown on the first device display. At 1230, location information associated with another party to the phone call is received. At 1240, the location of the other party is displayed on the map. The method 1200 further comprises displaying a route between the parties. Points of interest (restaurants, movie theaters, museums, stores, etc.) along the route can also be shown as well.

In any of the examples disclosed herein, the mobile device can operate as a mobile phone in any mobile device configuration (open or closed, attached or detached). For example, when a mobile device is in a closed configuration, notice of an incoming call can be provided at the first display and the first device can operate as the phone handset. During a call, a user can transform the mobile device from a closed to an open configuration, detach the second device from the first device and continue the call using the second device as the phone handset. In such a case, the mobile device can be configured to detect when the second device is detached from the first device and automatically switch to using the second device as the phone handset. The mobile device can also be configured to automatically switch to using the first device as the phone handset when the mobile device detects that the second device has been reattached to the first device. A controller of the first device (e.g., controller 810) can be configured to monitor whether a second device is connected to or detached from the first device, and to automatically switch between wireless and physical communication modes for communicating with the second device. Alternatively, the user can select whether the first device or the second device is to be used as a phone handset. For example, the first device can continue operating as a phone handset when the second device is detached from the first device.

Notice of an incoming call, text message, email or any other type of communication can be displayed on either the first display, the second display, or both displays. For example, notification of an incoming call can be displayed on a second display and can comprise the calling party's name, phone number and an associated image. If either the first or the second device is communicating with an external device such as a television, personal computer or other media player, notification can be provided to the external device as well. Notification can be made by an audio and/or video signal.

In any of the mobile devices as described herein, the first and second devices can simultaneously operate as a handset during a call, thus allowing two users at one end of the phone call to participate in the call. The second device can operate as a phone handset when the first device is docked at a communication location, charging station, etc., attached to an external device by a cable, or is otherwise prevented from being moved. For example, when the first device is outputting media to an external media player via a wireless connection, the first device must remain within physical proximity to the media player.

A detached second device can cooperate with a first device in additional configurations. For example, a mobile device can be used as a car navigation system. A first device can be running a map or navigation application, and the second device can display step-by-step directions for a route displayed on the first display. Alternatively, the second device operates independently of the first device. For example, the second device can operate as a media player and output audio data to a car's sound system via either a wired or a wireless connection. The first device could be placed in a dashboard mount, and the second device could be placed in the same mount as the first device, a separate mount, or elsewhere within the driver's view. Notification of an incoming call can be displayed on the first display, the second display or both displays. Either device can be configured to perform operations in response to voice commands, allowing for hands free operation while a user is driving or performing other tasks. For example, the mobile device can be configured to answer or place a call, play a song or launch an application in response to a voice command.

In any of the examples described herein, the mobile device can be configured to operate in a "three screen" mode in which the mobile device can output media or content to a television, monitor or other external device comprising a viewable display. The media can be output to the external device by the first device, either wirelessly or through a physical connection. For example, the first device could be docked and the media can be output via a cable connecting the docking station to the external device. In some embodiments, the second device can output the media to the external device. In other embodiments, both the first and second devices can output the media to the external device. Regardless of which device outputs content, the first and/or second devices can control the output of media to the external media player.

In one example of a mobile device operating in "three screen" mode, a detached second device can remotely control the output of signals sent by a first device to an external media player. For instance, the second device can control browsing of a media gallery (photo, video, audio, etc.) displayed on the external media device. A user can control browsing of the gallery by providing touch input (tap input, flick or multi-touch gestures, etc.) or by gesturing with the second device. For example, left-right or right-left gestures can cause a previous or following media file to be displayed, and a down-up gesture can cause media file to be played. The second device can also be configured to display information complementary to that displayed on the external display by the primary device. For example, the second device can show thumbnails of photographs displayed on the external media device.

Figure 13:
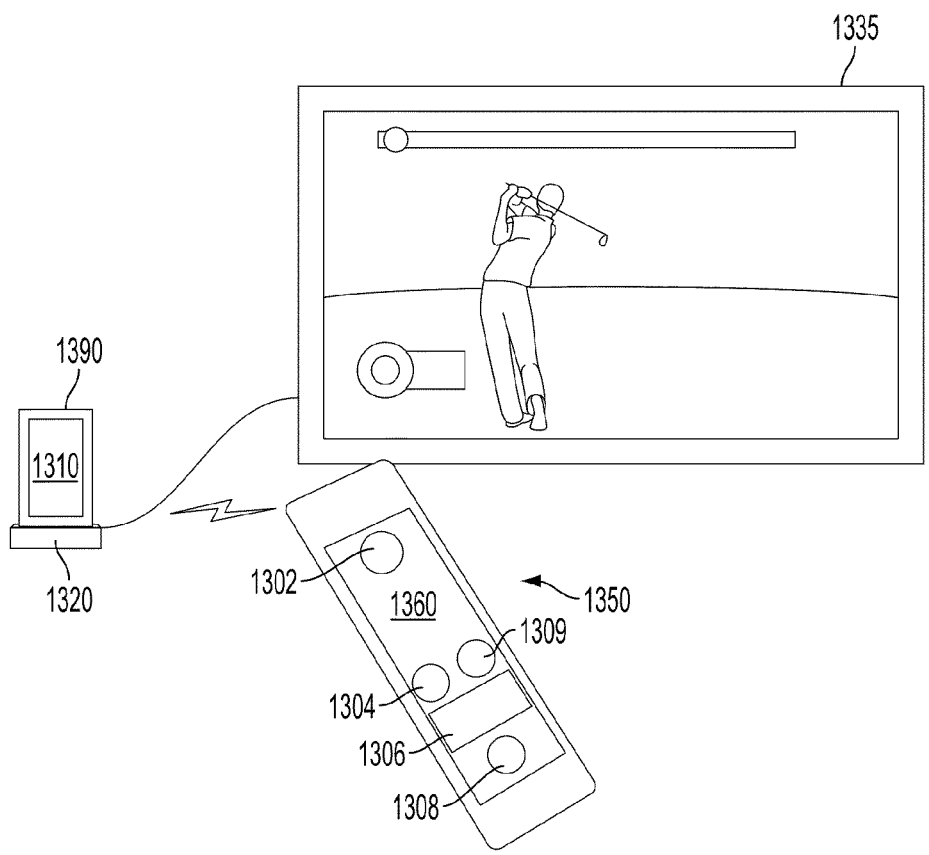
FIG. 13 shows a second device of an exemplary dual display mobile device operating as a remote game controller for a first device outputting video to a television.

In another example, a detached second device can act as a remote game controller. FIG. 13 shows a first device 1390 docked with a docking station 1320 and delivering output to a television 1335. Although a wired connection is shown, communication between the dock 1320 and the television 1335 can be wireless. The corresponding second device 1350 can display game controls 1302, 1304, 1306, 1308, and 1309 on a second display 1360 and provide input to the game running on the first device 1390 via wireless communication. In yet another example, a detached second device communicating wirelessly with a first device can act as a virtual keyboard to provide text input to an application running on the first device and whose output is displayed on a computer, television or other device.

The second device can provide remote input to an application running on the first device whose output is displayed on the first display. For example, the golf application displayed on the television 1335 can be displayed on a first display 1310 of the first device 1390. A user can motion or gesture with the second device 1350 to simulate a golf swing and an accelerometer in the second device can detect the motion. The second device can wirelessly communicate data indicating the detected motion to the first device, and a corresponding golfing action can be displayed on the first display 1310.

Figure 14:
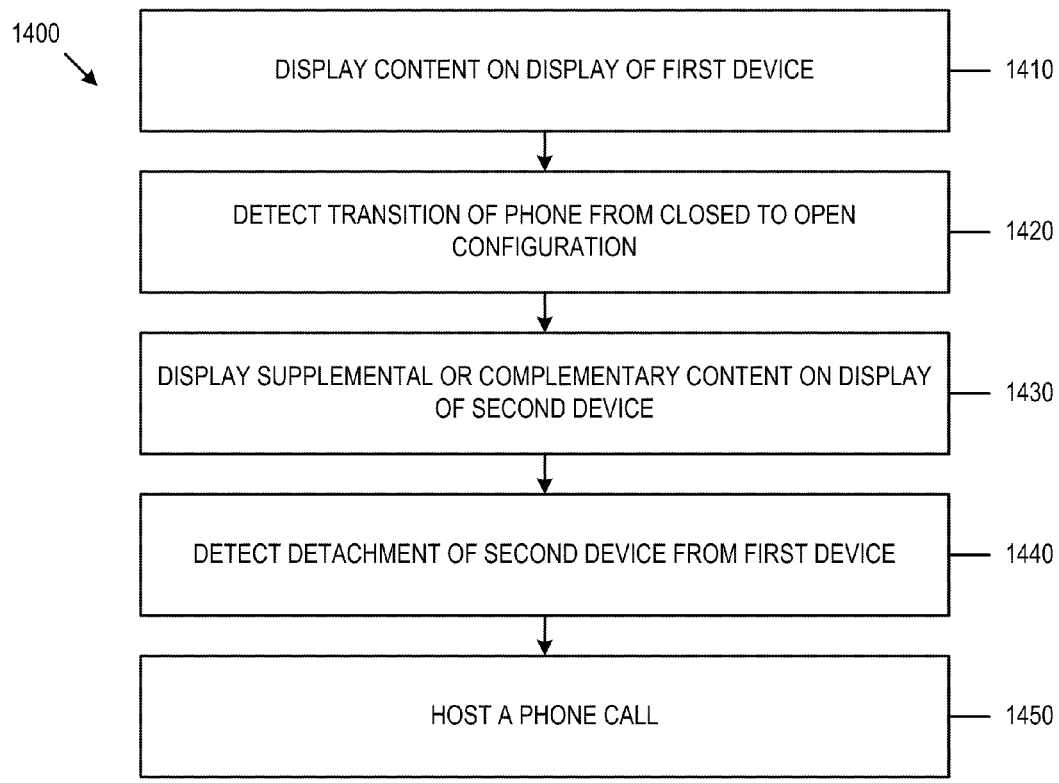
FIG. 14 is a flowchart of a second embodiment of a method of operating a dual display mobile device as a mobile phone.

FIG. 14 is a flowchart of a second embodiment of a method 1400 of operating a dual display mobile device as a mobile phone. The method 1400 can be executed, for example, by a mobile device being opened to expose both displays, having its second device detached, and hosting a mobile phone call. At 1410, content is displayed at a first device display. The content can be the output of an application running on the mobile phone, such as an email program. At 1420, transition of the phone from a closed configuration to an open configuration is detected. In the example, the mobile phone can detect the user expanding the mobile phone to show the second display. At 1430, supplemental or complementary content, such as an email message preview pane or a virtual keyboard, is displayed on the second device display. At 1440, detachment of the second device from the first device is detected. In the example, the mobile device can detect a user detaching the second device to make a phone call or receive an incoming call. At 1450, the mobile phone can host a phone call. As part of hosting the call, the first and second devices can wirelessly communicate with each other while the mobile phone simultaneously wirelessly communicates with a mobile communication network.

In any of the examples described herein, the first and second devices can be configured to operate independently when they are out of communication range with each other. In such a configuration, first or second devices containing a wireless modem capable of communicating with a mobile communications network can operate as a mobile phone. Typically, this will be the first device. Any first or second device not capable of communicating with a cellular or satellite mobile communication network can still perform a wide range of functions. For example, a second device can operate as a stand-alone media player. A user can take such a second device with him or her to the gym, on a walk, etc. and listen to songs stored on second device. Any of the mobile devices as described herein comprising a detachable second device can thus provide a user with the option of carrying a smaller mobile device when not all of the capabilities of the first device are needed, or when a more compact mobile device is desired. As discussed above, the second device can communicate with other nearby devices configured for wireless communication. For example, equipment at a gym (treadmill, exercise bike, etc.) can be enabled for wireless communication and the second device can transmit audio and/or video media for output by the gym equipment.

Figure 15:
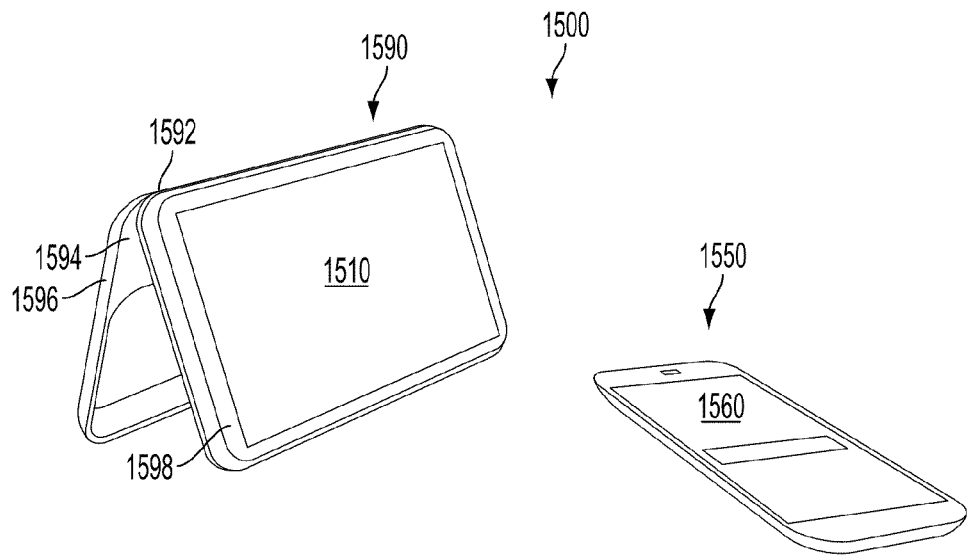
FIG. 15 shows an exemplary dual display mobile device comprising a first device having a hinged edge in a detached configuration.

In any of the exemplary mobile devices described herein, a detachable secondary device can be stowed or attached to a first device in a manner other than that shown in FIGS. 1 through 5. For example, FIG. 15 shows a mobile device 1500 comprising a first device 1590 and a second device 1550. The first device comprises a first display 1510 and a hinged edge 1592. The second device 1550 comprises a second display 1560. The first device 1590 can be opened by pivoting a back face 1596 away from a front face 1598 to reveal a cavity 1594 in which the second device 1550 can be stored. The hinged edge 1592 also allows the first device 1590 to stand upright when the first device is opened to reveal the cavity 1594.

In another example, the mobile device can communicate with one or more external devices to operate in a "three device" configuration. The communication can comprise the mobile device sending, for example, control signals, commands or content (e.g., images, video, sound, text, data) to the external devices. The "three device" mode is more flexible than the "three screen" mode previously described, as a mobile device operating in the "three device" mode is capable of delivering more than just content to external devices. For example, the mobile device can send control signals, commands or content to a general purpose computing system (e.g., laptop, personal or tablet computer), a media player (e.g., television, audio player) or another mobile communication device (e.g., mobile phone, personal digital assistant). The mobile and third devices can communicate in wired and/or wireless fashion. The communication between the mobile and the third devices can be performed by the first and/or second device and can take place while the mobile device is in a detached or attached (e.g., closed or open) configuration. Content communicated to and output at the third device can be associated with content output at the first and/or second devices. For example, the first device can deliver to a third device television, data representing photos belonging to a digital photo album stored on the first device. The third device can display larger, full-sized versions of the photos while smaller, thumbnail versions of the photos can be shown on a second device. In addition, an index of digital photos displayed on the second and third devices can be displayed on a display of the first device. A mobile device delivering commands and content to one or more third device(s) can be considered to be operating as a content server for the external devices.

Figure 16:
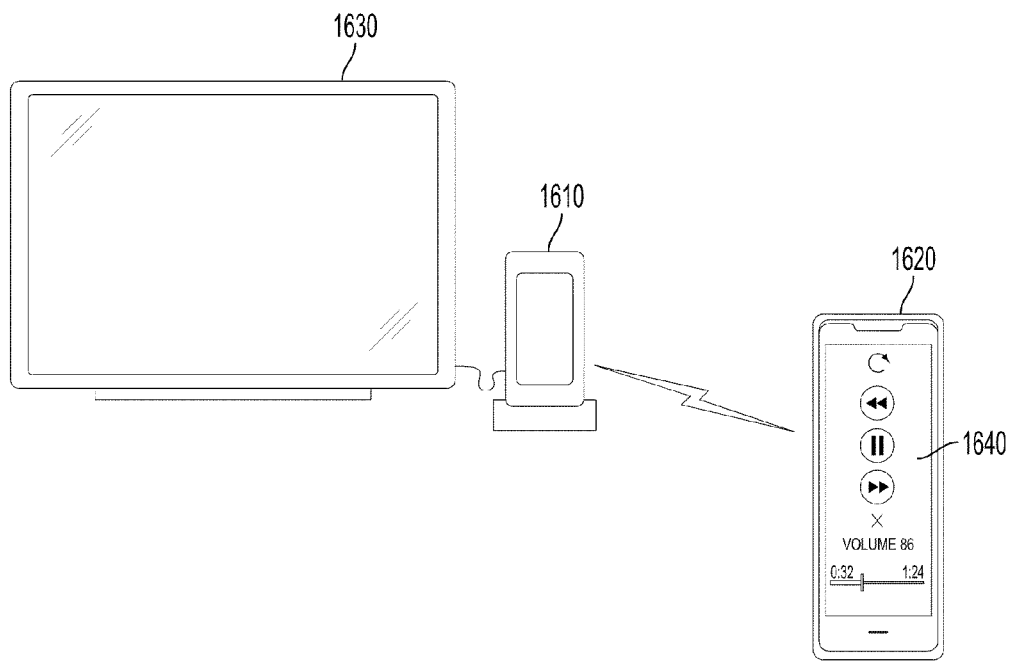
FIG. 16 shows an exemplary second device operating as a remote control for a docked first device outputting media to a television.

FIG. 16 shows a mobile device comprising a docked first device 1610 and a detached second device 1620 from the first device 1610. The first device 1610 is in wireless communication with the second device 1620 and in wired communication with a third device 1630, a television. The second device 1620 is configured to operate as a remote control for video content being delivered to and displayed on the third device television 1630. The touchscreen 1640 of the second device 1620 comprises remote controls such as rewind, pause, fast forward and volume control.

Figure 17:
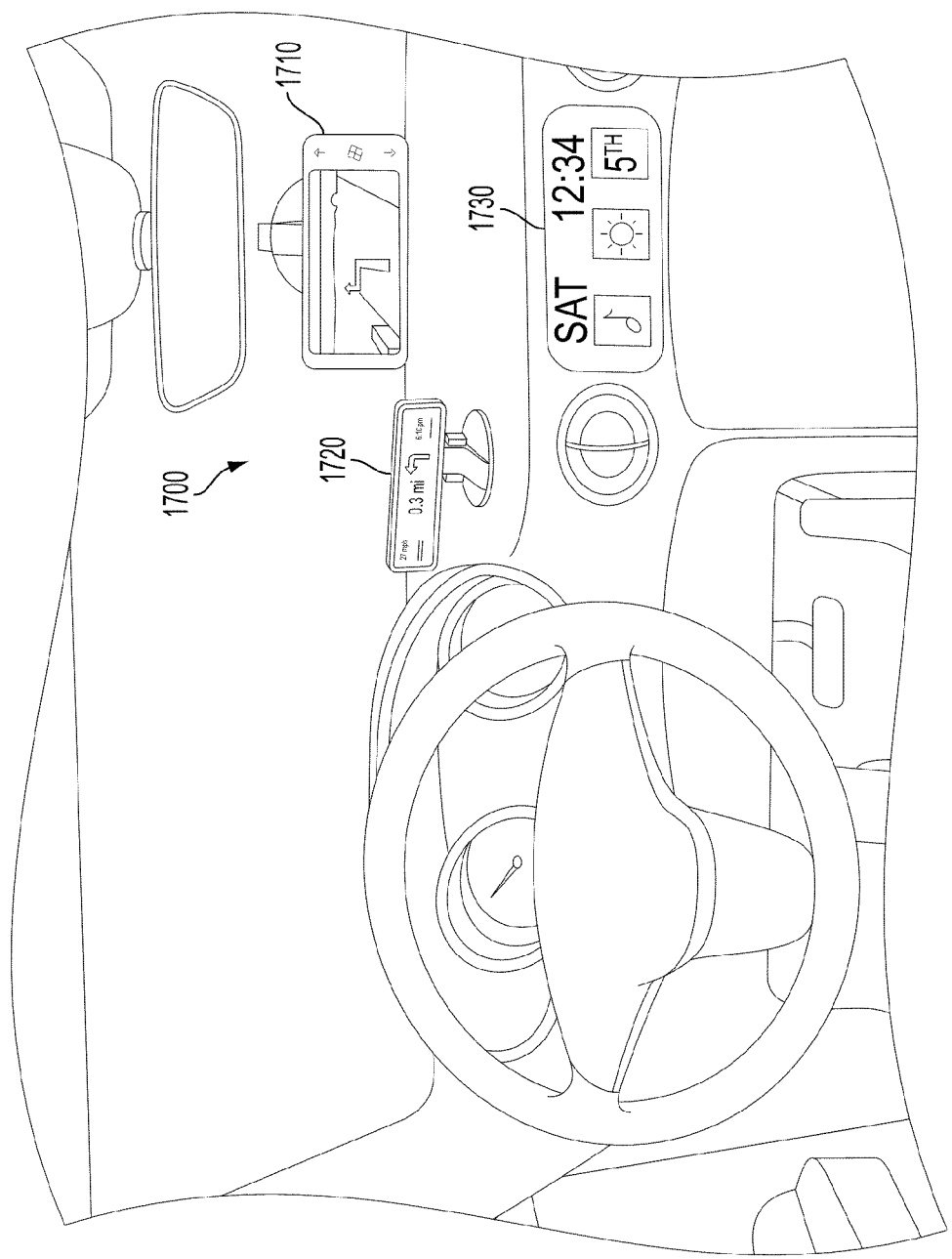
FIG. 17 shows an exemplary dual display mobile phone device operating as an in-car navigation system.

FIG. 17 shows another example of a mobile device operating in "three device" mode, the third device is a computing system or display incorporated into a vehicle. A mobile device 1700 operating as an in-car navigation system comprises a first device 1710 and a second device 1720. The first device 1710 is mounted on the dashboard at a location conveniently viewable by a driver and displays a navigation route. The second device 1720 is mounted at a location closer to the driver and displays step-by-step directions for the route. The first and second devices 1710 and 1720 communicate wirelessly with each other. The second device 1720 can be mounted at any location that is convenient for viewing by or receiving input from the driver. For example, the second device 1720 can be attached to a mount in the steering wheel or a center console to allow the driver to provide touch input to the second device 1720 (e.g., to display the next direction in a route, place a phone call, etc.). The second device 1720 can also be placed in a location convenient for receiving audio instructions from the driver to minimize driver distractions. In some embodiments, the first and/or second devices 1710 and 1720 can communicate with a computing device incorporated into the vehicle, for example, to deliver content for display on an integrated display 1730 of the computing system. For example, the mobile device 1700 can communicate with an in-car computing system to route the audio signal of a mobile phone call to the car's speaker system or to provide a graphical user interface for launching various applications and features of the mobile device, such as the interface displayed on the display 1730 shown in FIG. 17. The mobile device could also communicate directly with in-car audio or video systems (e.g., speakers, DVD players) to provide content for playback at these devices.

In any of the "three device" or "three screen" systems, the first and second devices can be configured to be controlled by any of the third devices. For example, the car display 1730 can be a touchscreen configured to accept input from a driver or passenger. A passenger can interact with the display 1730 to, for example, direct the mobile device to place a call while the car is in motion, or to search the Internet to find directions to the nearest gas station.

In any of the examples disclosed herein, the mobile device can perform any of the disclosed functions while the device is charging. For example, a first device docked for charging can host a mobile phone call with a second device operating as a handset. In another example, a docked first device can be controlled by a detached second device to communicate with an external third device. The docked first device can be in wired or wireless communication with the third device.

In another example, a mobile device can be configured to dock with or attach to a terminal comprising a larger display and/or a physical keyboard (mini- or full-sized) to enable a better viewing experience and easier keyboard input. A mobile device docked in such a configuration can allow a user to surf the web, check email, make a phone call, etc., by using the wireless communication network accessibility features of the mobile device. The second device can be removed from the first device and remain in wireless communication with the first device while the first device is attached to the terminal. In some embodiments, the terminal need not comprise both a screen and a keyboard. For example, the first device can attach to a larger screen and the mobile device can be used as the keyboard, for example, by using the first or the second device as a virtual keyboard, or by using a second device physical keyboard.

In any of the embodiments described herein, the second device can include the hardware components contained in the first device and/or be capable of performing the functionalities of the first device as disclosed herein. For example, the second device can comprise a controller with similar or greater capabilities as the controller used in the first device, and can have the same or a greater amount of memory as the first device. The second device can also comprise a cellular modem in addition to a cellular modem located in the first device. In other examples, the second device can be the primary computing device of the mobile device. For example, the mobile device could be a dumb terminal comprising a first device including a larger screen and keyboard and having the profile of a laptop, tablet or netbook personal computer and a second device configured to operate as the primary computing device of the mobile device (i.e., responsible for controlling Internet accessibility, hosting a phone call, storing media).

Figure 18:
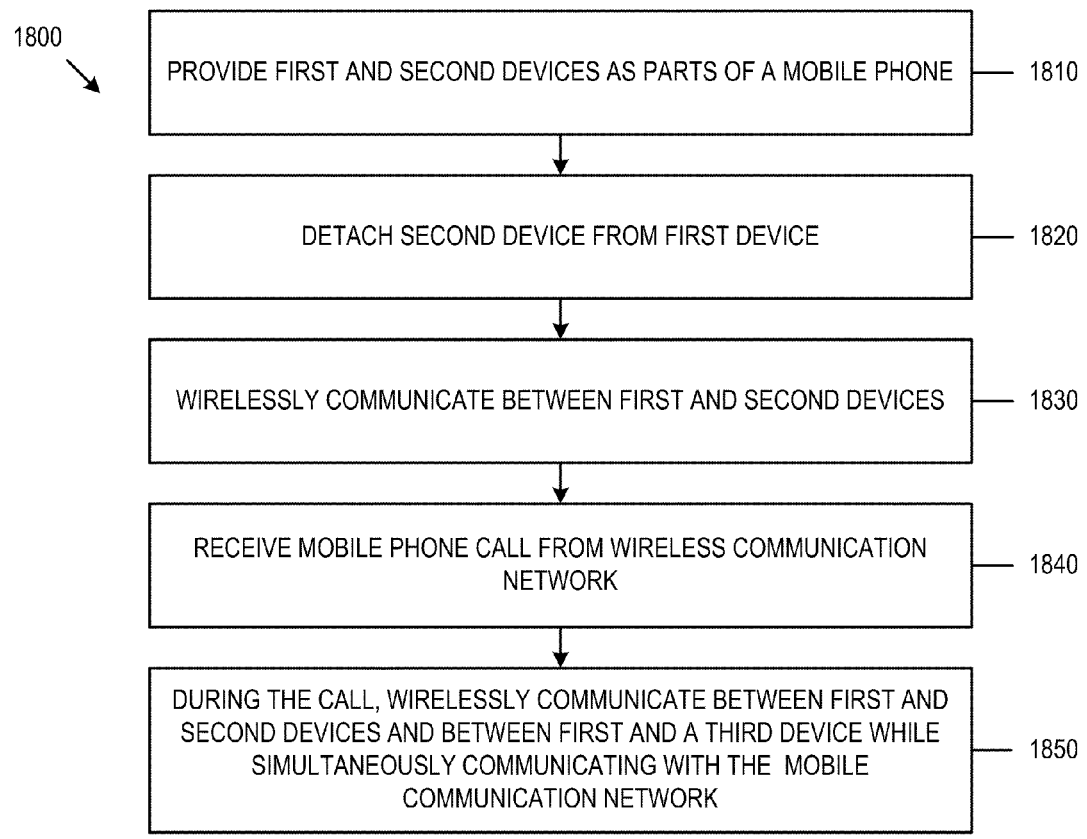
FIG. 18 is a flowchart of a third embodiment of a method of using a mobile device as a mobile phone.

FIG. 18 is a flowchart of a third embodiment of a method 1800 of operating a mobile communication device as a phone. The method 1800 can be executed by, for example, a mobile device simultaneously hosting a mobile phone call and running an application, such as navigation software. At 1810, a first device and a second device are provided as parts of a mobile phone. The second device is releasably attachable from the first device. At 1820, the second device is detached from the first device. At 1830, the first and second devices communicate wirelessly. At 1840, a mobile phone call is received from a wireless communication network. At 1850, during the call, the first device wirelessly communicates with both the second device and a third device simultaneous with the mobile device communicating with the mobile communication network. For example, the first device can communicate via cellular modem with the wireless communication network and act as a base station to transmit voice data wirelessly to the second devices and video data to a television.

Figure 19:
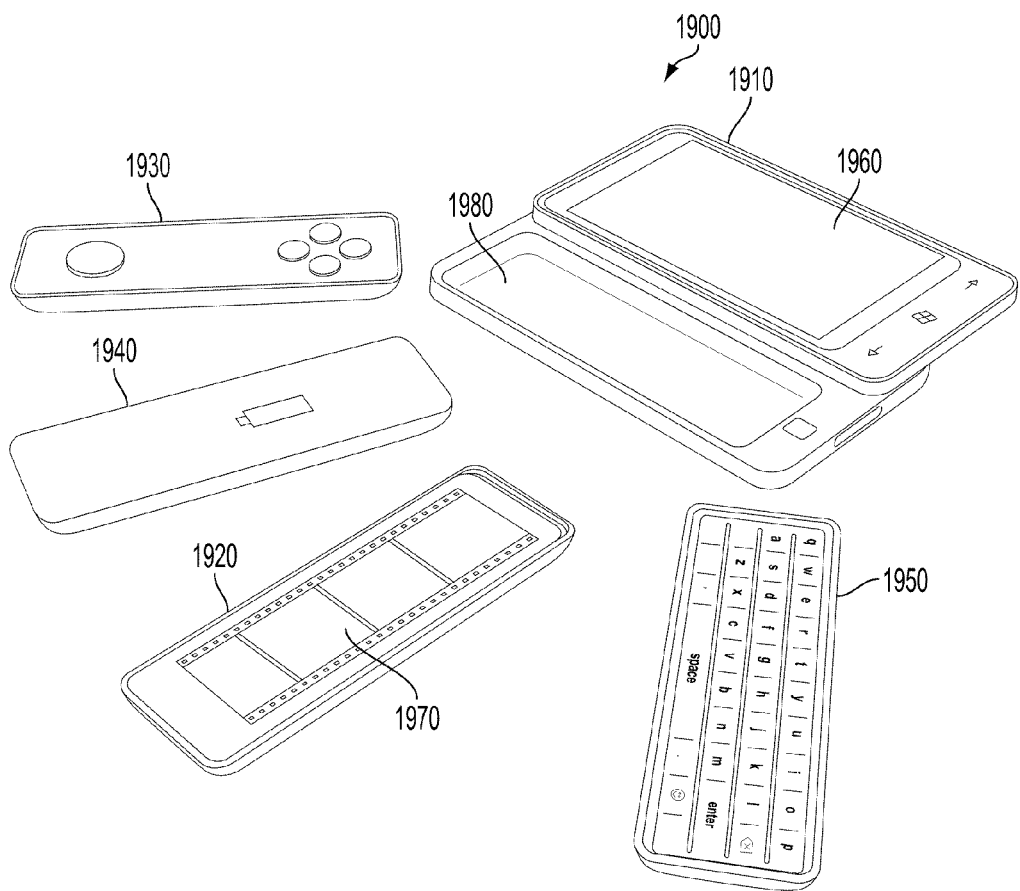
FIG. 19 shows an exemplary mobile phone device with multiple, interchangeable second devices.

FIG. 19 shows a mobile device 1900 comprising a first device 1910 and multiple, interchangeable second devices 1920, 1930, 1940 and 1950. The first device 1910 comprises any of the first devices as disclosed herein and includes a first display 1960. The multiple second devices comprise any of the second devices disclosed herein, including second device 1920 comprising a display 1970, game controller 1930, battery 1940 and physical keyboard 1950. Additional second devices not shown in FIG. 19 can also be used with first device 1910. For example, additional second devices can include expansion storage devices (hard drive or solid state), solar panels for charging a battery of the first device 1910 or for directly powering the first device 1910, or medical sensors (surface thermometers, etc.). The game controller 1930 and keyboard 1950 can each comprise a speaker and a microphone to enable mobile phone handset operation. The first device 1910 can simultaneously communicate with one or more of the multiple second devices.

As used herein, simultaneous communication between a first device and two or more second devices includes interleaved communication between the devices. That is, simultaneous communication includes communication between the first device and one of the second devices interleaved with communication between the first device and at least one of the other second devices.

As shown in FIG. 19, the second devices 1920, 1930, 1940 and 1950 are interchangeable and can be stowed in a well 1980 of the first device. Alternatively, the second devices can be releasably attached to the first device 1910 using any other connection method described herein. The second devices are interchangeable in that an attached second device can be removed from the first device and replaced with any one of the other second devices. In some embodiments, only one of the second devices can be releasably attached to the first device at a time. In other embodiments, more than one of the second devices can be simultaneously attached to the first device. For example, the size of the second devices can be reduced from that shown in FIG. 19 to allow multiple second devices to fit in the well 1980 and connect with the first device 1910.

A mobile device comprising a first device capable of wirelessly communicating with multiple second devices simultaneously allows for a wide variety of operational modes. For example, a first device executing a gaming application can simultaneously communicate with two or more detached game controllers to provide a multi-user gaming experience. Additionally, a battery pack can be attached to the device for extended playing time. Further, simultaneous with running the game application, the first device can also host a mobile phone call. The first device can wirelessly communicate with a wireless communication network and a second device to host the call. In another example, multiple second devices can operate as handsets for a single mobile phone call, to provide for a party line feature. Alternatively, the first device can be configured to host multiple mobile phone calls, with one or more second devices operating as handsets for each mobile call.

A mobile device comprising multiple second devices capable of operating as mobile phone handsets can replace a single home telephone line connected to multiple telephones throughout the home. For example, a mobile device user returning home can place the mobile phone first device in a charging station and use a second device anywhere in the house as a handset for placing or receiving calls. Other household members can have their own second device to place or receive mobile calls, access the Internet, view content stored on the first device, or utilize any other mobile device feature described herein.

In an example of a mobile device comprising multiple second devices operating in a three device mode, two or more second devices can control the first device to send content or control signals to one or more third devices. In another example, one of the second devices can control the first device to send commands or control signals to another second device, or to send media for display at the second device. In this example, one or more of the second devices can act as a third device. Thus, the first device can act as a hub or server for multiple second and third devices. The first device can send control signals, commands or content to any one of the second and third devices. In other examples, the multiple second devices can communicate directly with each other, without having to communicate through the first device.

Figure 20:
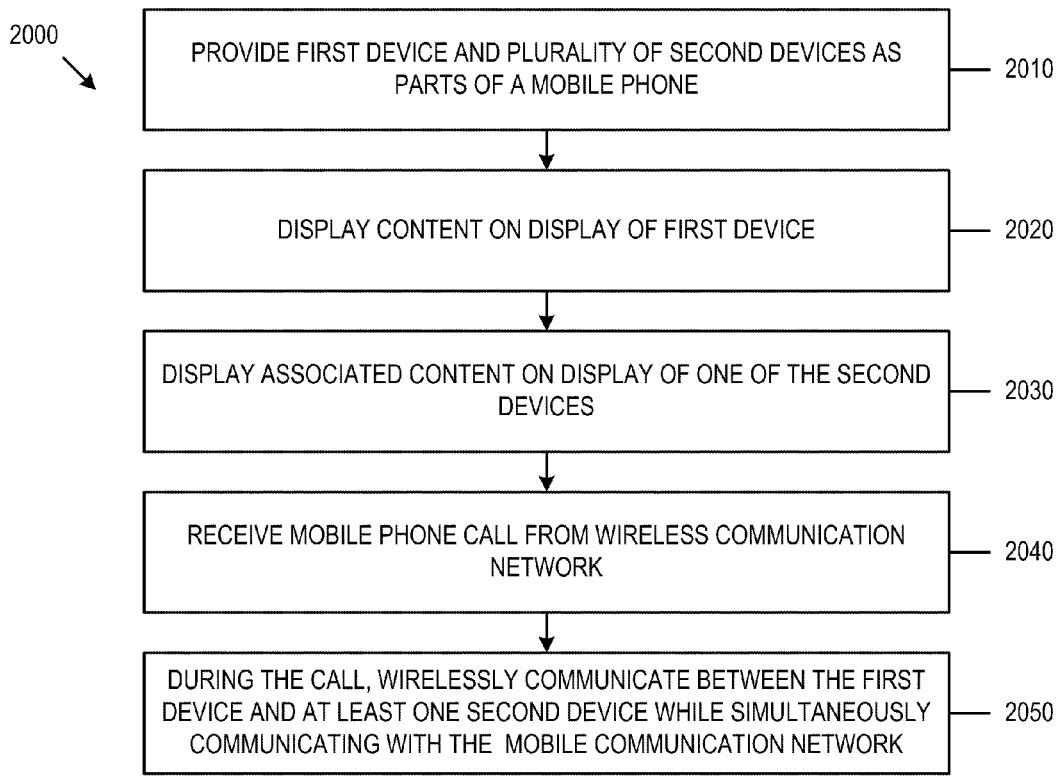
FIG. 20 is a flowchart of an embodiment of a method of using a mobile device comprising multiple second devices as a mobile phone.

FIG. 20 is a flowchart of an embodiment 2000 of a method of using a mobile device comprising multiple second devices as a mobile phone The method 2000 can be executed by, for example, a mobile device simultaneously hosting a mobile phone call and delivering video to an external display such as a television or monitor. At 2010, first and second devices are provided as parts of a mobile device. The first and second devices are releasably attachable from each other. At 2020, the second device is detached from the first device. At 2030, the first and second devices wirelessly communicate with each other. At 2040, a mobile phone call is received from a wireless communication network. At 2050, during the call, the first device wirelessly communicates with a second device and a third device simultaneously with the mobile device communicating with the mobile communication network. For example, the first device can communicate via cellular modem with the wireless communication network and act as a base station to transmit voice data wirelessly to the second device and to transmit video data for display on a television or monitor third device.

Figure 21:
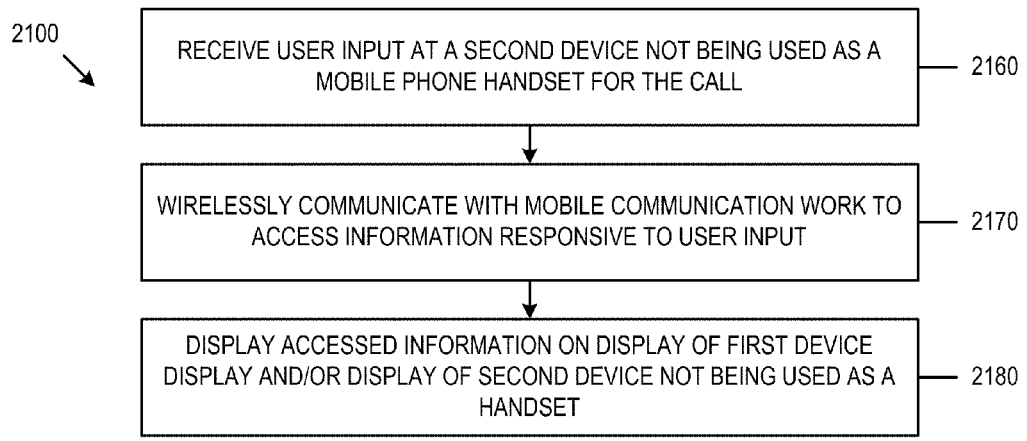
FIG. 21 is a flowchart of additional operations that can be performed as part of the flowchart shown in FIG. 20 for wirelessly communicating with a mobile communication network responsive to input from a second device not being used as a mobile phone handset.

FIG. 21 is a flowchart of additional operations that can be performed as part of the flowchart shown in FIG. 20. The additional operations are for wirelessly communicating to retrieve information in response to user input received at a second device not operating as a handset. For instance, in the above example, the mobile device simultaneously hosting the call and running navigation software can access the Internet to retrieve information in response to a user request supplied at a second device that is not being used as a handset for the call. At 2160, additional user input, such as a search request for nearby movie theaters, is received at a second device not operating as a handset. At 2170, the mobile device wirelessly communicates with the mobile communication network to access information responsive to the additional user input. For example, the mobile device can access the Internet to retrieve a list of nearby movie theaters showing a specified movie. At 2180, the accessed information is displayed on the first device display and/or the display of the second device receiving the additional user input.

Additional embodiments and aspects of the technologies described herein are described in the following numbered embodiments.

Embodiment 1

A mobile phone (200, 500, 1900), comprising: first device (290, 590, 1910) having a first display (210, 510, 1960) and a first wireless modem (835); a plurality of second devices (250, 550, 1920, 1930, 1940, 1950), at least one of the second devices (250, 550, 1920, 1930, 1940, 1950) having a second display (260, 560, 1970) and a second wireless modem (885) and operable as a handset of the mobile phone (200, 500, 1900), each of the second devices (250, 550, 1920, 1930, 1940, 1950) being releasably attachable to the first device (290, 590, 1910) so that in a detached configuration, the first device (290, 590, 1910) is detached from each of the second devices (250, 550, 1920, 1930, 1940, 1950) for wireless communication between the first device (290, 590, 1910) and the at least one of the second devices (250, 550, 1920, 1930, 1940, 1950).

Embodiment 2

The mobile phone (200, 500, 1900) of any of the previous numbered embodiments, wherein the second devices (250, 550, 1920, 1930, 1940, 1950) are interchangeably attachable to the first device (290, 590, 1910).

Embodiment 3

The mobile phone (200, 500, 1900) of any of the previous numbered embodiments, wherein the plurality of second devices (250, 550, 1920, 1930, 1940, 1950) comprises at least one second device (250, 550, 1920, 1930, 1940, 1950) selected from the group consisting of a game controller (1350, 1930), a battery (1940), and a physical keyboard (1950).

Embodiment 4

The mobile phone (200, 500, 1900) of any of the previous numbered embodiments, wherein the first device (290, 590, 1910) further comprises a controller (810) configured to wirelessly communicate simultaneously with at least two of the second devices (250, 550, 1920, 1930, 1940, 1950).

Embodiment 5

A method of using a mobile phone (200, 500, 1900), comprising: providing a first device (290, 590, 1910) and a plurality of second devices (250, 550, 1920, 1930, 1940, 1950) as parts of the mobile phone (200, 500, 1900), the second devices (250, 550, 1920, 1930, 1940, 1950) being interchangeably attachable to the first device (290, 590, 1910); displaying first content on a first display (210, 510, 1960) of the first device (290, 590, 1910); displaying second content associated with the first content on a second display (260, 560, 1970) of one of the second devices (250, 550, 1920, 1930, 1940, 1950); receiving or placing a mobile phone call from/to a wireless communication network (809); and during the mobile phone call, wirelessly communicating between the first device (290, 590, 1910) and at least two of the second devices (250, 550, 1920, 1930, 1940, 1950) while simultaneously communicating with the wireless communication network (809).

Embodiment 6

The mobile phone (200, 500, 1900) of any of the previous numbered embodiments, wherein at least two of the second devices (250, 550, 1920, 1930, 1940, 1950) operate as mobile phone handsets for the mobile phone call.

Embodiment 7

The mobile phone (200, 500, 1900) of any of the previous numbered embodiments, further comprising displaying third content associated with the first and second content on a third display (260, 560, 1970) of one of the second devices (250, 5500, 1960).

Embodiment 8

The mobile phone (200, 500, 1900) of any of the previous numbered embodiments wherein a first one of the second devices (250, 550, 1920, 1930, 1940, 1950) operates as a mobile phone handset for the mobile phone call, the method further comprising: during the mobile phone call: receiving user input at a second one of the second devices (1920, 1930, 1940, 1950) having a third display (260, 560, 1970); wirelessly communicating with the mobile communication network to access information responsive to the user input; and displaying the accessed information on the third display (260, 560, 1970) of the second one of the second devices (250, 550, 1920, 1930, 1940, 1950) and/or the first display (210, 510, 1960) of the first device (290, 590, 1910).

Embodiment 9

The mobile phone (200, 500, 1900) of any of the previous numbered embodiments further comprising: detaching a first one of the second devices (250, 550, 1920, 1930, 1940, 1950) from the first device (290, 590, 1910); and attaching a second one of the second devices (250, 550, 1920, 1930, 1940, 1950) to the first device (290, 590, 1910).

Embodiment 10

The mobile phone (200, 500, 1900) of any of the previous numbered embodiments wherein a first one of the second devices (250, 550, 1920, 1930, 1940, 1950) operates as a mobile phone handset for the mobile phone call and the method further comprises receiving or placing one or more additional mobile phone calls from/to a wireless communication network (809), one or more of the second devices (250, 550, 1920, 1930, 1940, 1950) operating as a mobile phone handset for each of the one or more additional mobile phone calls.

Embodiment 11

A method of using a mobile phone (200, 500, 1900), comprising: providing a first device (290, 590, 1910) and a second device (250, 550, 1920, 1930, 1940, 1950) as parts of the mobile phone (200, 500, 1900) that are releasably attachable from each other; detaching the second device (250, 550, 1920, 1930, 1940, 1950) from the first device (290, 590, 1910); wirelessly communicating between the first and second device (290, 590, 1910, 250, 550, 1920, 1930, 1940, 1950); receiving a mobile phone call from a wireless communication network (809); and during the mobile phone call, wirelessly communicating between the first and second devices (290, 590, 1910, 250, 550, 1920, 1930, 1940, 1950) and communicating between the first device (290, 590, 1910) and a third device (1335, 1630) while simultaneously communicating with the wireless communication network (809).

Embodiment 12

The mobile phone (200, 500, 1900) of any of the previous numbered embodiments wherein the first device (290, 590, 1910) and the one or more third devices (1335, 1630) communicate wirelessly.

Embodiment 13

The mobile phone (200, 500, 1900) of any of the previous numbered embodiments wherein the wireless communication between the first device (290, 590, 1910) and the third device (1335, 1630) comprises content to be output at the third device (1335, 1630) or commands for controlling the output of content at the third device (1335, 1630).

Embodiment 14

The mobile phone (200, 500, 1900) of any of the previous numbered embodiments further comprising: providing one or more additional second devices (250, 550, 1920, 1930, 1940, 1950) as parts of the mobile phone (200, 500, 1900) that are interchangeably attachable to the first device (290, 590, 1910); and wirelessly communicating between the first device (290, 590, 1910) and at least one of the additional second devices (250, 550, 1920, 1930, 1940, 1950).

Embodiment 15

The mobile phone (200, 500, 1900) of any of the previous numbered embodiments further comprising displaying third content on a third display (260, 560, 1970) of the at least one of the additional second devices (250, 550, 1920, 1930, 1940, 1950), wherein the third content is associated with the first content and the second content.

We claim:

1. A mobile phone, comprising:
   a first device having a first display and a first wireless modem;
   a plurality of second devices, at least one of the plurality of second devices having a second display and a second wireless modem and operable as a handset of the mobile phone, each of the plurality of second devices being releasably attachable to the first device so that in a detached configuration, the first device is detached from each of the plurality of second devices for wireless communication between the first device and the plurality of second devices and in an attached configuration the first display and second display operate as an integrated display;
   the plurality of second devices including a third display for receiving display information from the first device or one of the other plurality of second devices.

2. The mobile phone of claim 1, wherein only one of the plurality of second devices can be attached to the first device at a time.

3. The mobile phone of claim 1, wherein the plurality of second devices are interchangeably attachable to the first device.

4. The mobile phone of claim 1, wherein the plurality of second devices comprises at least one second device selected from the group consisting of a game controller, a battery, and a physical keyboard.

5. The mobile phone of claim 1, wherein the first device further comprises a first cellular modem separate from the first wireless modem and at least one of the plurality of second devices comprises a second cellular modem.

6. The mobile phone of claim 1, wherein the first device further comprises a controller configured to wirelessly communicate simultaneously with at least two of the plurality of second devices.

7. A method of using a mobile phone, comprising:
providing a first device and a plurality of second devices as parts of the mobile phone, the plurality of second devices being interchangeably attachable to the first device;
displaying first content on a first display of the first device;
displaying second content associated with the first content on a second display of one of the plurality of second devices so that the first display and second display combine to form a shared display;
receiving or placing a mobile phone call from/to a wireless communication network; and
during the mobile phone call, wirelessly communicating between the first device and at least two of the plurality of second devices while simultaneously communicating with the wireless communication network; and
displaying third content associated with the first or second content on a third display of one of the plurality of second devices.

8. The method of claim 7 wherein at least two of the plurality of second devices operate as mobile phone handsets for the mobile phone call.

9. The method of claim 7, wherein a first one of the plurality of second devices operates as a mobile phone handset for the mobile phone call, the method further comprising:
during the mobile phone call:
receiving user input at a second one of the plurality of second devices having the third display;
wirelessly communicating with the mobile communication network to access information responsive to the user input; and
displaying the accessed information on the third display of the second one of the plurality of second devices and/or the first display of the first device.

10. The method of claim 7 further comprising updating the first content based on wireless communication between the first device and the second one of the plurality of second devices.

11. The method of claim 7, further comprising:
detaching a first one of the plurality of second devices from the first device; and
attaching a second one of the plurality of second devices to the first device.

12. The method of claim 7, wherein the plurality of second devices comprises at least one second device selected from the group consisting of a game controller, a battery, and a physical keyboard.

13. The method of claim 7, wherein a first one of the plurality of second devices operates as a mobile phone handset for the mobile phone call;
the method further comprising receiving or placing one or more additional mobile phone calls from/to a wireless communication network, one or more of the plurality of second devices operating as a mobile phone handset for each of the one or more additional mobile phone calls.

14. A method of using a mobile phone, comprising:
providing a first device and a second device as parts of the mobile phone that are releasably attachable from each other;
detaching the second device from the first device;
wirelessly communicating between the first and second device;
receiving a mobile phone call from a wireless communication network; and
during the mobile phone call, wirelessly communicating between the first and second devices and communicating between the first device and a third device while simultaneously communicating with the wireless communication network;
wherein first content is displayed on a first display of the third device, the method further comprising displaying second content on a second display of the second device, wherein the first content is associated with the second content.

15. The method of claim 14, wherein the first device and the third device communicate wirelessly.

16. The method of claim 14, wherein the wireless communication between the first device and the third device comprises content to be output at the third device or commands for controlling the output of content at the third device.

17. The method of claim 14, further comprising:
providing one or more additional second devices as parts of the mobile phone that are interchangeably attachable to the first device; and
wirelessly communicating between the first device and at least one of the additional second devices.

18. The method of claim 14, further comprising displaying third content on a third display of the at least one of the additional second devices, wherein the third content is associated with the first content and the second content.

* * * * *